(12) United States Patent
Park et al.

(10) Patent No.: US 10,488,590 B2
(45) Date of Patent: Nov. 26, 2019

(54) ADIABATIC POLARIZATION ROTATOR-SPLITTER

(71) Applicant: Finisar Corporation, Sunnyvale, CA (US)

(72) Inventors: Bryan Park, Sunnyvale, CA (US); Zheng Yong, Toronto (CA); Joyce Kai See Poon, Ontario (CA)

(73) Assignee: Finisar Corporation, Sunnyvale, CA (US)

( * ) Notice: Subject to any disclaimer, the term of this patent is extended or adjusted under 35 U.S.C. 154(b) by 0 days.

(21) Appl. No.: 15/826,636

(22) Filed: Nov. 29, 2017

(65) Prior Publication Data

US 2018/0149810 A1    May 31, 2018

Related U.S. Application Data

(60) Provisional application No. 62/427,672, filed on Nov. 29, 2016.

(51) Int. Cl.
*G02B 6/12* (2006.01)
*G02B 6/126* (2006.01)
(Continued)

(52) U.S. Cl.
CPC ............ *G02B 6/126* (2013.01); *G02B 6/125* (2013.01); *G02B 6/12007* (2013.01);
(Continued)

(58) Field of Classification Search
CPC ........................................................ G02B 6/12
(Continued)

(56) References Cited

U.S. PATENT DOCUMENTS

| 5,245,465 A * | 9/1993 | Tomita | ................. | G02F 1/0955 |
|---|---|---|---|---|
| | | | | 359/244 |
| 7,792,403 B1 * | 9/2010 | Little | ................. | G02B 6/1228 |
| | | | | 385/11 |

(Continued)

FOREIGN PATENT DOCUMENTS

EP    3015887 A1    5/2016

OTHER PUBLICATIONS

International Search Report and Written Opinion dated May 29, 2018 in related PCT Application No. PCT/US2017/063801.
(Continued)

*Primary Examiner* — Kaveh C Kianni
(74) *Attorney, Agent, or Firm* — Maschoff Brennan

(57) ABSTRACT

Various polarization rotator splitter (PRS) configurations are disclosed. In an example embodiment, a system includes a PRS that includes a silicon nitride (SiN) rib waveguide core that includes a rib and a ridge that extends vertically above the rib, the SiN rib waveguide core having a total height $h_{SiN}$ from a bottom of the rib to a top of the ridge, a rib height $h_{rib}$ from the bottom of the rib to a top of the rib, a rib width $w_{rib}$, and a top width $w_{SiN}$ of the ridge. The rib width $w_{rib}$ varies along at least a portion of a length of the SiN rib waveguide core.

17 Claims, 16 Drawing Sheets

(51) Int. Cl.
  *G02B 6/122* (2006.01)
  *G02B 6/125* (2006.01)
  *G02B 6/27* (2006.01)
  *G02B 6/293* (2006.01)
  *G02B 6/14* (2006.01)

(52) U.S. Cl.
  CPC ......... *G02B 6/1228* (2013.01); *G02B 6/2726* (2013.01); *G02B 6/2766* (2013.01); *G02B 6/2773* (2013.01); *G02B 6/29352* (2013.01); *G02B 6/14* (2013.01); *G02B 2006/1215* (2013.01); *G02B 2006/12035* (2013.01); *G02B 2006/12061* (2013.01); *G02B 2006/12097* (2013.01); *G02B 2006/12119* (2013.01); *G02B 2006/12152* (2013.01)

(58) Field of Classification Search
  USPC .......................................................... 385/11
  See application file for complete search history.

(56) References Cited

U.S. PATENT DOCUMENTS

| | | | | |
|---|---|---|---|---|
| 8,855,449 | B1* | 10/2014 | Roth | G02B 6/2773 385/11 |
| 9,122,006 | B1* | 9/2015 | Roth | G02B 6/126 |
| 9,817,186 | B2 | 11/2017 | Kamei et al. | |
| 2004/0114872 | A1* | 6/2004 | Nagai | G02B 6/12002 385/50 |
| 2005/0254128 | A1* | 11/2005 | Watts | G02B 6/126 359/558 |
| 2006/0018584 | A1* | 1/2006 | Watts | G02B 6/126 385/11 |
| 2008/0019637 | A1* | 1/2008 | Little | G02B 6/1228 385/28 |
| 2009/0136191 | A1* | 5/2009 | Bi | G02F 1/0036 385/131 |
| 2010/0002989 | A1* | 1/2010 | Tokushima | G02B 6/1228 385/14 |
| 2012/0163750 | A1* | 6/2012 | Chen | G02B 6/105 385/3 |
| 2013/0142475 | A1* | 6/2013 | Dallesasse | G02B 6/26 385/11 |
| 2014/0133796 | A1* | 5/2014 | Dong | G02B 6/126 385/11 |
| 2014/0153862 | A1* | 6/2014 | Picard | G02B 6/1228 385/11 |
| 2015/0338577 | A1* | 11/2015 | Shi | G02B 6/126 385/11 |
| 2016/0041340 | A1* | 2/2016 | Shi | G02B 6/305 385/14 |
| 2016/0131837 | A1* | 5/2016 | Mahgerefteh | G02B 6/124 385/14 |
| 2016/0178842 | A1* | 6/2016 | Goi | G02B 6/126 385/11 |
| 2016/0131842 | A1 | 12/2016 | Mahgerefteh et al. | |
| 2017/0017033 | A1* | 1/2017 | Oka | G02B 6/126 |
| 2017/0068048 | A1* | 3/2017 | Kamei | G02B 6/126 |
| 2017/0176679 | A1* | 6/2017 | Oka | G02B 6/125 |
| 2017/0179680 | A1* | 6/2017 | Mahgerefteh | G02B 6/12004 |
| 2017/0315294 | A1* | 11/2017 | Socci | G02B 6/126 |
| 2018/0224605 | A1* | 8/2018 | Painchaud | G02B 6/14 |

OTHER PUBLICATIONS

Wesley D. Sacher et al. "Polarization rotator-splitters in standard active silicon photonics platforms," Optics Express, vol. 22, No. 4, Feb. 24, 2014, p. 3777-3786, XP05530609, ISSN: 2161-2072, DOI: 10.1364/OE.22.003777.

Yu et al., Intra-chip optical interconnection based on polarization division multiplexing photonic integrated circuit, Optics Express 28330, vol. 25, No. 23, Nov. 13, 2017, 7 pgs.

* cited by examiner

ADIABATIC POLARIZATION ROTATOR-SPLITTER

CROSS-REFERENCE TO RELATED APPLICATION

This application claims the benefit of and priority to U.S. Provisional App. No. 62/427,672, filed Nov. 29, 2016. The foregoing application is incorporated herein by reference.

FIELD

The embodiments discussed herein are related to adiabatic polarization rotators and/or splitters.

BACKGROUND

Unless otherwise indicated herein, the materials described herein are not prior art to the claims in the present application and are not admitted to be prior art by inclusion in this section.

U.S. Pat. Pub. 2016/0131842 A1 (hereinafter the '842 publication), which is incorporated herein by reference, discloses two-stage adiabatically coupled photonic systems that may adiabatically couple light from an interposer waveguide to a silicon nitride (SiN) waveguide with a tapered end and from the SiN waveguide to a silicon (Si) waveguide with a tapered end. Alternatively, light can be adiabatically coupled in the opposite direction, e.g., from the Si waveguide to the SiN waveguide to the interposer waveguide. The SiN waveguide and the Si waveguide may be implemented in a Si photonic integrated circuit (PIC). The '842 publication additionally discloses, among other things, a polarization rotator that may be formed in the Si PIC.

The subject matter claimed herein is not limited to embodiments that solve any disadvantages or that operate only in environments such as those described above. Rather, this background is only provided to illustrate one example technology area where some embodiments described herein may be practiced.

BRIEF SUMMARY OF SOME EXAMPLE EMBODIMENTS

This Summary is provided to introduce a selection of concepts in a simplified form that are further described below in the Detailed Description. This Summary is not intended to identify key features or essential characteristics of the claimed subject matter, nor is it intended to be used as an aid in determining the scope of the claimed subject matter.

Some embodiments described herein generally relate to adiabatic polarization rotators and/or splitters.

In an example embodiment, a system includes a polarization rotator splitter (PRS). The PRS includes a silicon nitride (SiN) rib waveguide core that includes a rib and a ridge that extends vertically above the rib, the SiN rib waveguide core having a total height $h_{SiN}$ from a bottom of the rib to a top of the ridge, a rib height $h_{rib}$ from the bottom of the rib to a top of the rib, a rib width $w_{rib}$, and a top width $w_{SiN}$ of the ridge. The rib width $w_{rib}$ varies along at least a portion of a length of the SiN rib waveguide core.

In another example embodiment, a system includes a PRS. The PRS includes a SiN strip waveguide and a Si strip waveguide. The SiN strip waveguide includes a SiN strip waveguide core with a rectangular cross-sectional shape with a height $h_{SiN}$ and a width $w_{SiN}$. The Si strip waveguide includes a Si strip waveguide core disposed beneath the SiN strip waveguide core. The SiN strip waveguide core includes an overlap portion, an input portion continuous with a first end of the overlap portion, and an output portion continuous with a second end of the overlap portion. The Si strip waveguide core is disposed exclusively beneath the overlap portion of the SiN strip waveguide core. The overlap portion of the SiN strip waveguide core laterally tapers outward from the first end of the overlap portion to the second end of the overlap portion.

In another example embodiment, a system includes a PRS that includes a first stage, a second stage, and a third stage. The first stage may be configured to: receive incoming light that includes a first component with a TE00 polarization and a second component with a TM00 polarization; and convert polarization of the second component from the TM00 polarization to a TE01 polarization. The second stage may be configured to: receive from the first stage the first component with the TE00 polarization and the second component with the TE01 polarization; output the first component with the TE00 polarization from a first intermediate output; convert polarization of the second component from the TE01 polarization to TE00 polarization; and output the second component with the TE00 polarization from a second intermediate output different than the first intermediate output. The third stage may be configured to: receive from the second stage the first component with the TE00 polarization and the second component with the TE00 polarization; spatially separate the first component from the second component; and output the first component with the TE00 polarization from a first output of the PRS and output the second component with the TE00 polarization from a second output of the PRS.

In another example embodiment, a system includes comprising a polarization rotator that includes a SiN strip waveguide and a Si strip waveguide. The SiN strip waveguide may include a SiN strip waveguide core. The Si strip waveguide may include a Si strip waveguide core disposed beneath the SiN strip waveguide core. The Si strip waveguide core may include a first end laterally aligned beneath a center of the SiN strip waveguide core and a second end opposite the first end. The second end of the Si strip waveguide core may be laterally offset from beneath the center of the SiN strip waveguide core by an offset distance.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION OF SOME EXAMPLE EMBODIMENTS

Embodiments disclosed herein relate to polarization splitters (PS) and/or polarization rotator-splitters (PRS) that can be implemented in systems such as described in the '842 publication, e.g., together with and/or in place of the polarization rotator disclosed in the '842 publication.

For example, incoming light may be adiabatically coupled from an interposer waveguide into a SiN waveguide with a tapered end as disclosed in the '842 publication. The incoming light may then be polarization split and/or rotated as described herein. Split and/or rotated outputs may be provided to SiN demultiplexers and/or other components in the Si PIC.

Figure 1A:
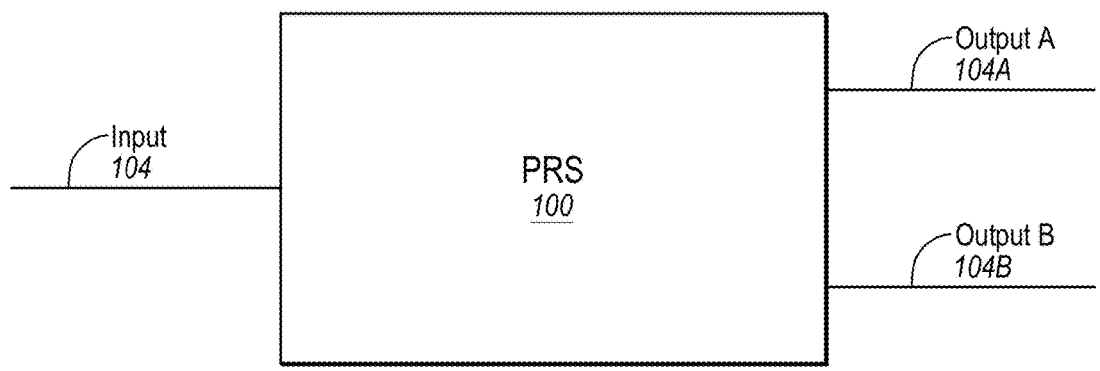
FIG. 1A illustrates an example PRS that includes a single input and two outputs.

FIG. 1A illustrates an example PRS 100 that includes a single input 102 and two outputs 104A, 104B (generically "outputs 104" or specifically "output A 104A" or "output B 104B"), arranged in accordance with at least one embodiment described herein. Each of the input 102 and the outputs 104 may in some embodiments include a SiN waveguide, e.g., a SiN waveguide core surrounded by a suitable cladding. The input 102 may receive an incoming light signal with two components with orthogonal polarizations, e.g., a first component with transverse electric (TE) polarization and a second component with transverse magnetic (TM) polarization. In an example embodiment, the PRS 100 is configured to split the incoming light signal into the first and second components, rotate or convert polarization of the second component from TM to TE polarization, output the first component with TE polarization on output A 104A, and output the second component with TE polarization on output B 104B.

Figure 1B:
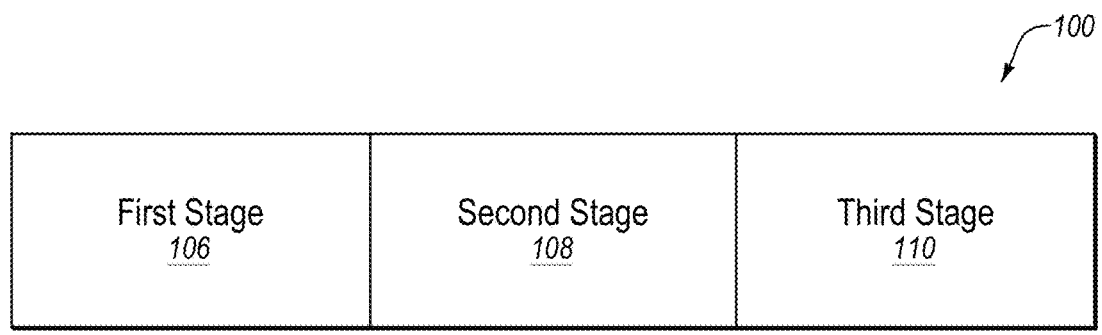
FIG. 1B is a block diagram of an example implementation of the PRS of FIG. 1A.

FIG. 1B is a block diagram of an example implementation of the PRS 100 of FIG. 1A, arranged in accordance with at least one embodiment described herein. As illustrated in FIG. 1B, the PRS 100 may generally include a first stage 106, a second stage 108, and a third stage 110. In an example embodiment, the first stage 106 may be configured to convert polarization of the second component of the incoming light signal from a TM00 polarization mode to TE01 polarization mode. The second stage 108 may be configured to both separate the first component and the second component of the incoming light signal into different waveguides and to convert polarization of the second component from the TE01 polarization mode to a TE00 polarization mode. The third stage 110 may be configured to spatially separate the first component and the second component from each other before outputting the first and second components, both with TE00 polarization, from the PRS 100.

Embodiments described herein include various embodiments of the PRS 100 that may be implemented in a Si PIC such as described in the '842 publication. In these and other embodiments, vertical asymmetry of a propagation path that includes one or more waveguides may be leveraged to convert polarizations and/or separate components of an incoming light signal. Various embodiments specifically disclosed herein include a first PRS with a rib SiN waveguide, a second PRS with both a SiN waveguide and a Si waveguide, and a third PRS with the polarization rotator disclosed in the '842 publication together with a SiN waveguide and an angled Si waveguide. Each will be discussed in turn.

I. First Example Embodiment

Figure 2:
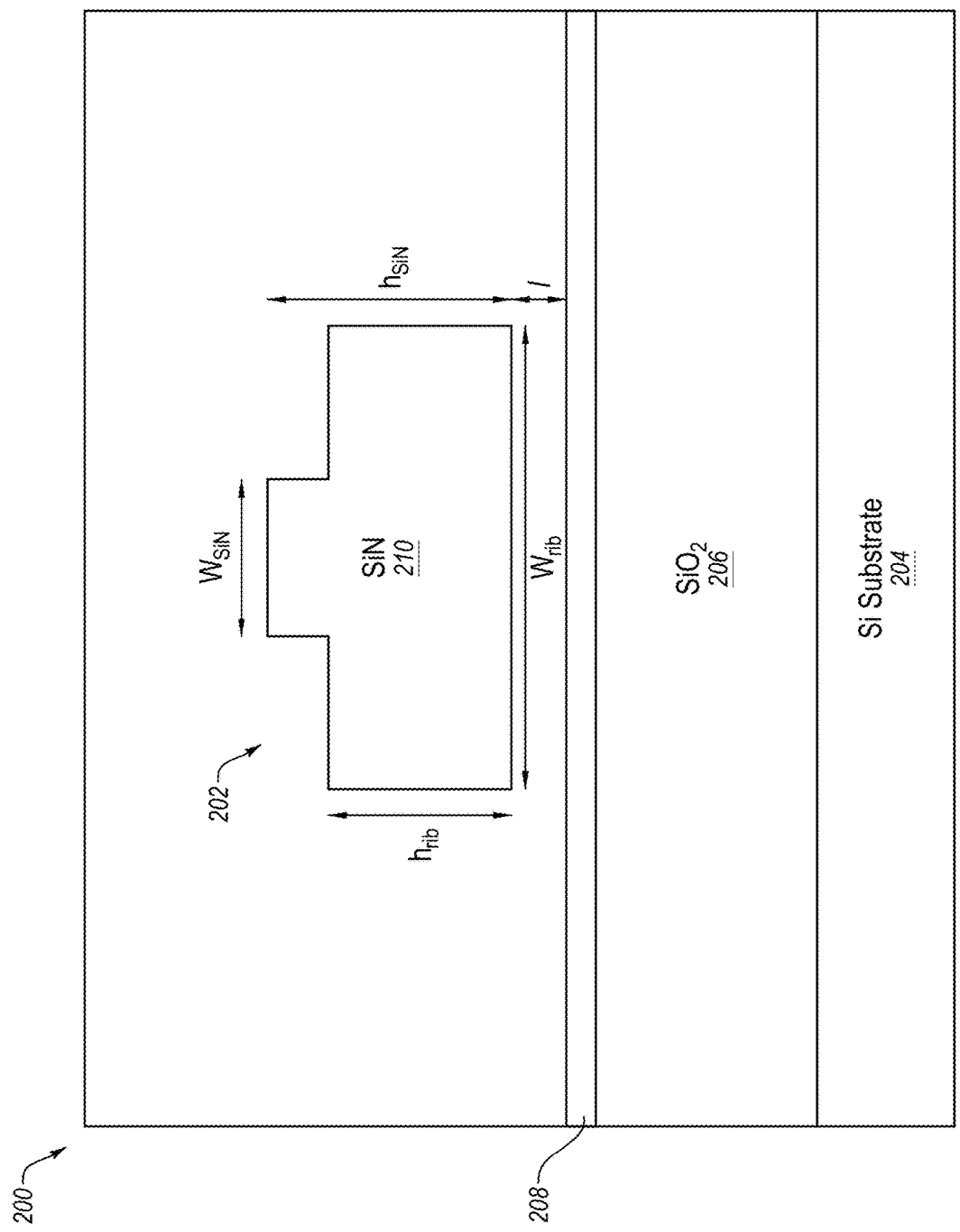
FIG. 2 is a cross-sectional view of a portion of a Si PIC with a PRS.

FIG. 2 is a cross-sectional view of a portion of a Si PIC 200 with a PRS 202, arranged in accordance with at least one embodiment described herein. The PRS 202 may include or correspond to the PRS 100 of FIGS. 1A and 1B. The Si PIC 200 may include a Si substrate 204, a buried oxide (BOX) layer 206 that may include silicon dioxide ($SiO_2$) or other suitable oxide, a SiN slab layer 208, and a SiN layer (not labeled) that includes the PRS 202. The Si PIC 200 may include one or more other layers, components, materials, etc. as disclosed in the '842 publication.

The PRS 202 includes a SiN waveguide that is ribbed along at least a portion of its length. The SiN waveguide includes a SiN waveguide core 210 together with surrounding cladding, which may include $SiO_2$ or other suitable cladding.

In an example implementation, the SiN slab layer 208 may have a thickness of about 50 nanometers (nm) and the SiN waveguide core 210 may be separated from the SiN slab layer 208 by a distance l of about 100 nm. A rib width $w_{rib}$ of the SiN waveguide core 210 may be variable along a length of the SiN waveguide core 210, as described in more detail below. A top width $w_{SiN}$ of the SiN waveguide core 210, e.g., of a ridge of the SiN waveguide core 210 that extends vertically above the rib of the SiN waveguide core 210, may be constant or variable along a length of the SiN waveguide core 210, as described in more detail below. A rib height $h_{rib}$ of the SiN waveguide core 210 may be about 0.5 micrometers (μm) in at least one embodiment. A total height $h_{SiN}$ of the SiN waveguide core 210 may be about 0.6 µm in at least one embodiment. The foregoing parameters of the various structures and layers of the Si PIC 200 with the PRS 202 may have the same or other values in other embodiments.

Figure 3:
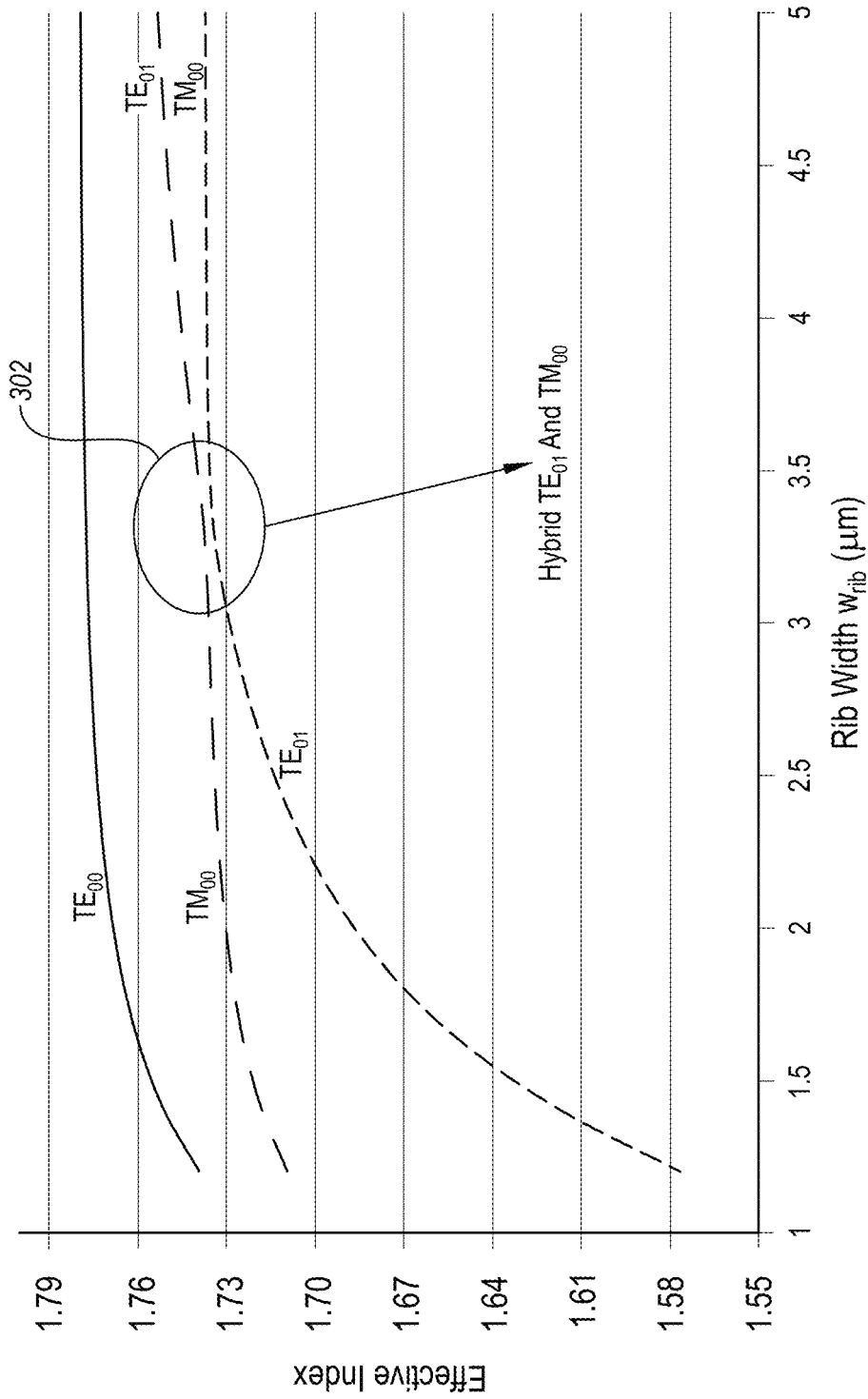
FIG. 3 includes simulations of effective index of a SiN waveguide core of FIG. 2 as a function of rib width $w_{rib}$ for various polarization modes.

FIG. 3 includes simulations of effective index of the SiN waveguide core 210 of FIG. 2 as a function of rib width $w_{rib}$ for various polarization modes (TE00, TM00, and TE01), arranged in accordance with at least one embodiment described herein. The simulations of FIG. 3 assume that the top width $w_{SiN}$ of the SiN waveguide core 210 is constant at 1.2 µm along the length of the SiN waveguide core 210 and that the rib height $h_{rib}$ is 0.5 µm.

Mode hybridization may occur when vertically asymmetric structural geometry (e.g., of the SiN waveguide core 210) changes (e.g., $w_{rib}$ widens) and such change leads to the effective indexes of two different polarization modes crossing each other. Light in one polarization mode can switch to another polarization mode after the mode hybridization if the structural change is gradual and therefore the transition process is adiabatic (i.e., mode 2 remains as mode 2, and mode 3 remains as mode 3). In view of the foregoing, it can be seen from the simulations of FIG. 3 that mode hybridization may occur for TM00 and TE01 polarization modes at a rib width $w_{rib}$ of about 3.4 µm. Thus, any light traveling in the SiN waveguide core 210 with TM00 polarization mode may convert polarization mode to the TE01 polarization mode after the rib width $w_{rib}$ increases more than 3.4 µm. The width at which mode hybridization occurs may also be referred to as the hybridization point, denoted at 302 in FIG. 3.

Figure 4:
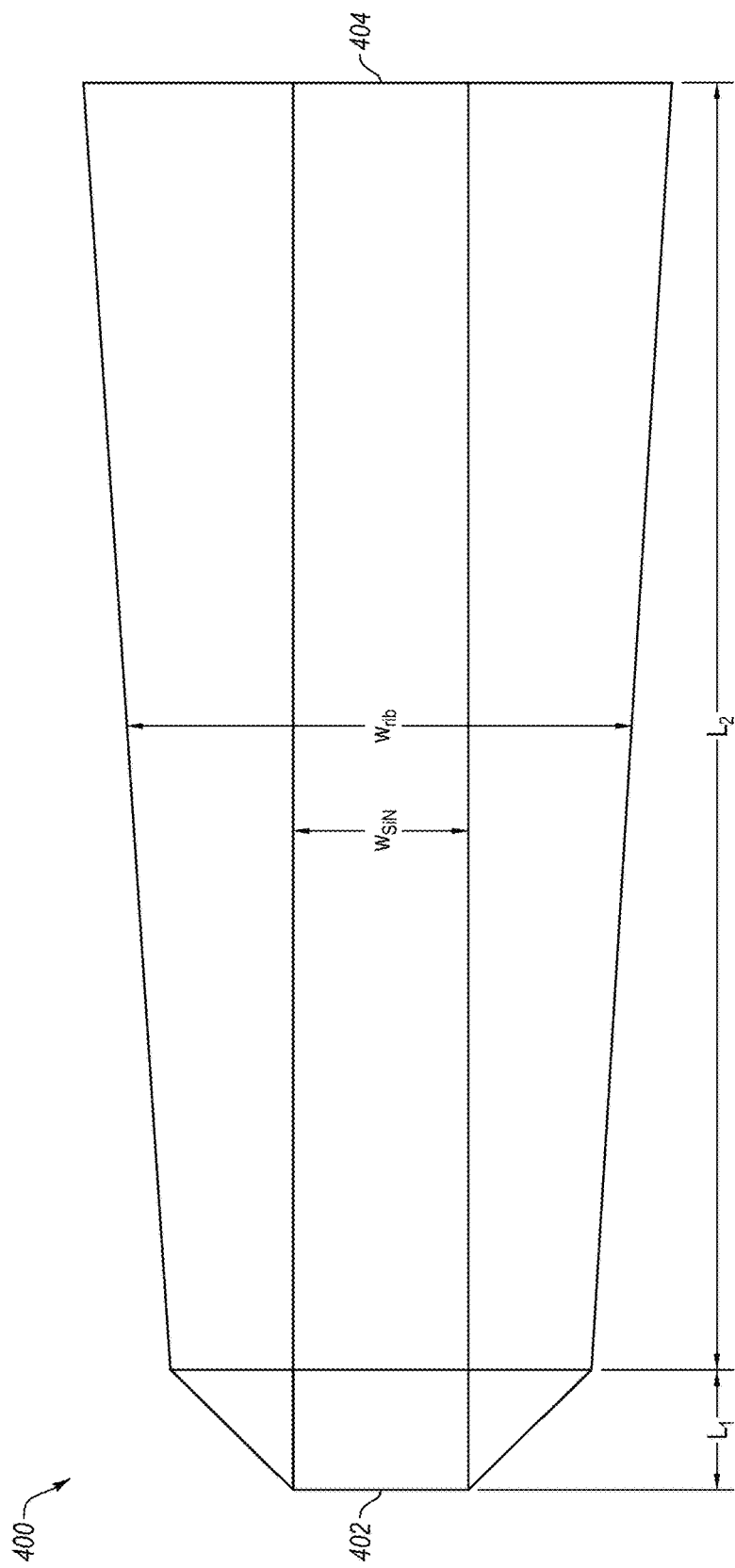
FIG. 4 illustrates an example first stage of the PRS of FIG. 2.

FIG. 4 illustrates an example first stage 400 of the PRS 202 of FIG. 2, arranged in accordance with at least one embodiment described herein. The first stage 400 may include or correspond to the first stage 106 of the PRS 100 of FIG. 1B. In particular, FIG. 4 illustrates an overhead view of a waveguide core of the first stage 400, which waveguide core may be surrounded by cladding (not illustrated in FIG. 4). At an input end 402 of the first stage 400, the waveguide core may have rectangular or square cross section in some embodiments. For instance, the waveguide core may have a rectangular cross section with a height of 0.6 µm and a width of 1.2 µm. Following the input end 402, a rib is formed in the waveguide core that tapers outward relatively quickly over a first length $L_1$ and that tapers outward relatively slowly over a second length $L_2$ to ensure an adiabatic transition around the hybridization point. Thus, the rib width $w_{rib}$ varies over the lengths $L_1$ and $L_2$ of the first stage 400. The top width $w_{SiN}$ may be constant over the lengths $L_1$ and $L_2$ and in the example of FIG. 4 is 1.2 µm. At an output end 404 of the first stage 400, the waveguide core may have a rib width $w_{rib}$ of 4 µm and a rib height $h_{rib}$ of 0.5 µm. The foregoing parameters of the waveguide core of the first stage 400 may have the same or other values in other embodiments.

Figure 5:
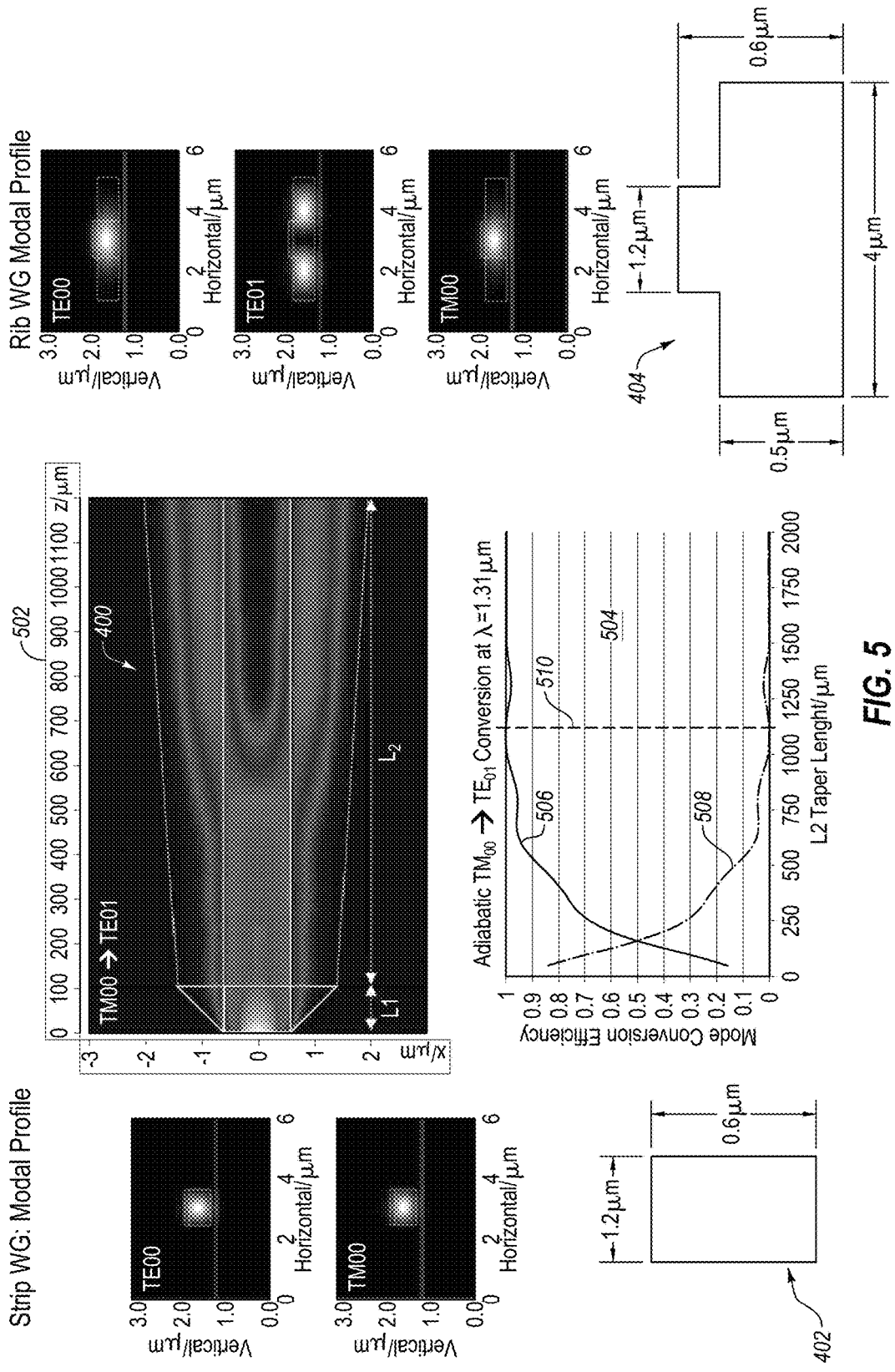
FIG. 5 illustrates various simulations associated with the first stage of FIG. 4.

FIG. 5 illustrates various simulations associated with the first stage 400 of FIG. 4, arranged in accordance with at least one embodiment described herein. FIG. 5 additionally illustrates cross-sectional views of the input end 402 and the output end 404 of the first stage 400. The simulations include modal profiles supported at both the input end 402 and the output end 404. In particular, at the input end 402 when the waveguide core has a rectangular cross section corresponding to a strip waveguide (labeled "Strip WG" in FIG. 5), the first stage 400 supports the TE00 and TM00 polarization modes. At the output end 404 where the waveguide core has the ribbed cross-sectional shape corresponding to a rib waveguide (labeled "Rib WG" in FIG. 5), the first stage 400 supports the TE00, TE01, and TM00 polarization modes. Any TE00 polarized light that enters at the input end 402 will exit at the output end 404 with the same TE00 polarization since the TE00 polarization mode does not hybridize with any other polarization modes for the depicted configuration of the waveguide core (see simulation of FIG. 3). In comparison, any TM00 polarized light that enters at the input end 402 is converted to, or evolves into, TE01 polarized light.

A simulation 502 in FIG. 5 simulates the evolution of the TM00 polarization mode to the TE01 polarization mode in the first stage 400. In particular, light with TM00 polarization (a single generally Gaussian lobe) illustrated in about a first half of the first stage 400 evolves into TE01 polarization (two laterally offset and generally Gaussian lobes) illustrated in about the second half of the first stage 400.

A simulation 504 in FIG. 5 simulates mode conversion efficiency as a function of the length $L_2$ of the first stage 400. The simulation 504 includes a first curve 506 that represents conversion efficiency of TM00 to TE01 and a second curve 508 that represents conversion efficiency of TM00 to TM00. With increasing length $L_2$, the conversion efficiency of TM00 to TE01 generally improves and the conversion of TM00 to TM00 generally decreases. For instance, when the length $L_2$ is equal to about 1125 µm as denoted at dashed line 510, TM00 to TE01 conversion efficiency is about 100% and TM00 to TM00 conversion efficiency is about 0%.

Figure 6:
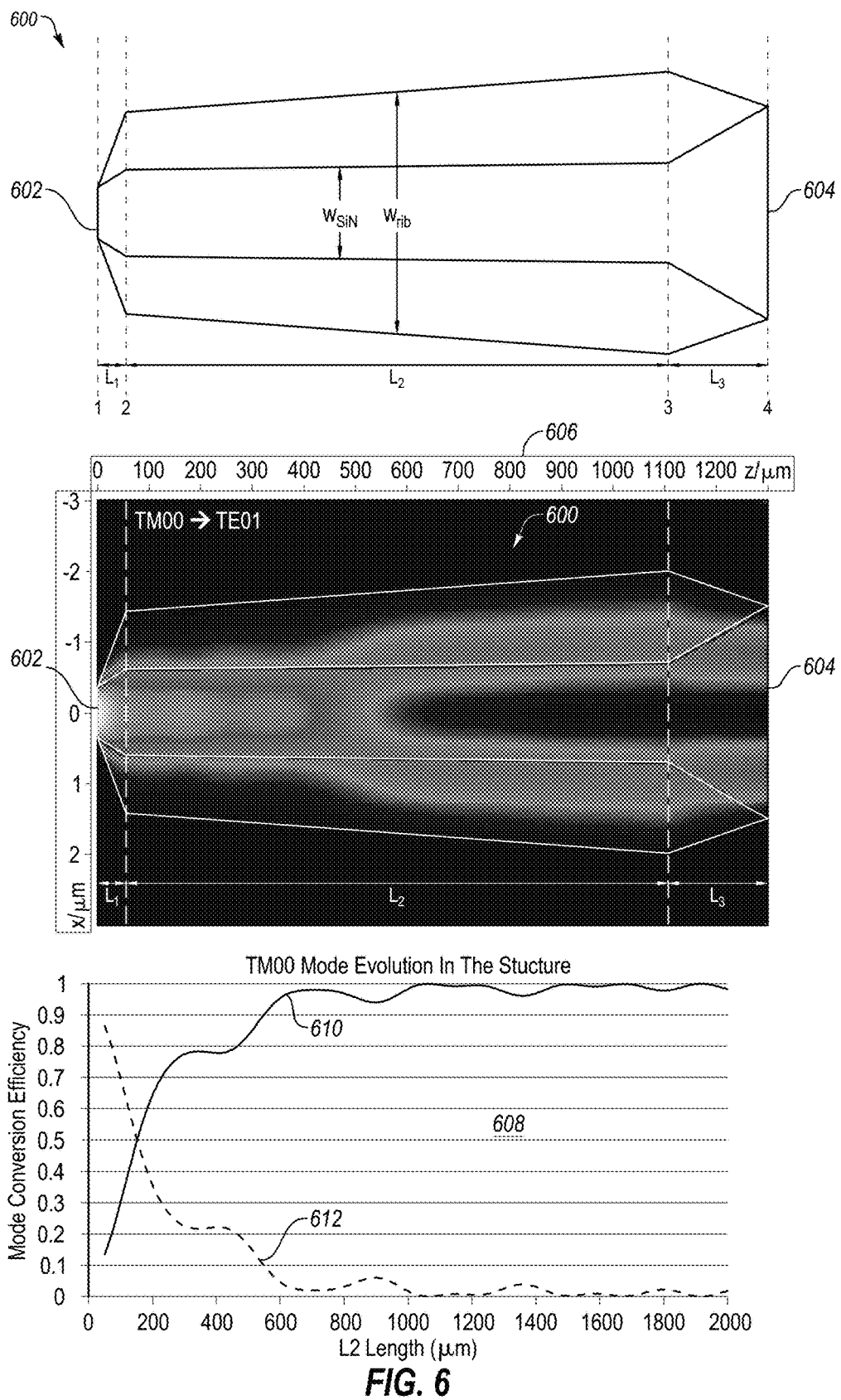
FIG. 6 illustrates another example first stage of the PRS of FIG. 2.

FIG. 6 illustrates another example first stage 600 of the PRS 202 of FIG. 2, arranged in accordance with at least one embodiment described herein. The first stage 600 may include or correspond to the first stage 106 of the PRS 100 of FIG. 1B. In particular, FIG. 6 illustrates an overhead view of a waveguide core of the first stage 600, which waveguide core may be surrounded by cladding (not illustrated in FIG. 6). At an input end 602 of the first stage 600, the waveguide core may have rectangular or square cross section in some embodiments. For instance, the waveguide core may have a rectangular cross section with a height of 0.6 µm and a width of 0.7 µm. Following the input end 602, a rib is formed in the waveguide core that tapers outward relatively quickly over a first length $L_1$ (e.g., from "1" to "2" in FIG. 6), that tapers outward relatively slowly over a second length $L_2$ (e.g., from "2" to "3" in FIG. 6) to ensure an adiabatic transition around the hybridization point, and that tapers inward relatively quickly over a third length $L_3$ (e.g., from "3" to "4" in FIG. 6). Thus, the rib width $w_{rib}$ varies over the lengths $L_1$, $L_2$, and $L_3$ of the first stage 600. The top width $w_{SiN}$ tapers outward relatively quickly over the first length $L_1$, tapers outward relatively slowly over the second length $L_2$, and tapers outward relatively quickly over the third length $L_3$. Table 1 below includes measurements of each of the rib width $w_{rib}$ and the top width $w_{SiN}$ in FIG. 6 according to an example embodiment and at locations "1", "2", "3", and "4" denoted with dashed lines in FIG. 6 and in units of micrometers (µm).

TABLE 1

|  | 1 | 2 | 3 | 4 |
| --- | --- | --- | --- | --- |
| $w_{SiN}$ (µm) | 0.7 | 1.2 | 1.4 | 3 |
| $w_{rib}$ (µm) | 0.7 | 2.8 | 4 | 3 |

The foregoing parameters of the top width $w_{SiN}$ and the rib width $w_{rib}$ may have the same or other values in other embodiments.

A simulation 606 in FIG. 6 simulates evolution of the TM00 polarization mode to the TE01 polarization mode in the first stage 600. In particular, light with TM00 polarization illustrated in about a first third of the first stage 600 evolves into TE01 polarization illustrated in the remainder of the first stage 600.

A simulation 608 in FIG. 6 simulates mode conversion efficiency as a function of the length $L_2$ of the first stage 600. The simulation 608 includes a first curve 610 that represents conversion efficiency of TM00 to TE01 and a second curve 612 that represents conversion efficiency of TM00 to TM00. With increasing length $L_2$, the conversion efficiency of TM00 to TE01 generally improves and the conversion of TM00 to TM00 generally decreases. For instance, when the length $L_2$ is equal to just over 1000 μm, TM00 to TE01 conversion efficiency is about 100% and TM00 to TM00 conversion efficiency is about 0%.

In the example of FIG. 6, the portion of the first stage 600 corresponding to the length $L_1$ may be referred to as a strip-rib taper portion, the portion of the first stage 600 corresponding to the length $L_2$ may be referred to as the rib waveguide taper portion to convert TM00 to TE01, and the portion of the first stage 600 corresponding to the length $L_3$ may be referred to as the rib-strip taper portion. In the first stage 600 (and in the first stage 400), TE00 remains as TE00 while TM00 evolves to TE01. In an example embodiment, TM00 to TE01 conversion efficiency may be about 0.998 (<0.01 dB loss) when $L_1$=50 μm, $L_2$=1050 μm, and $L_3$=200 μm.

Figure 7:
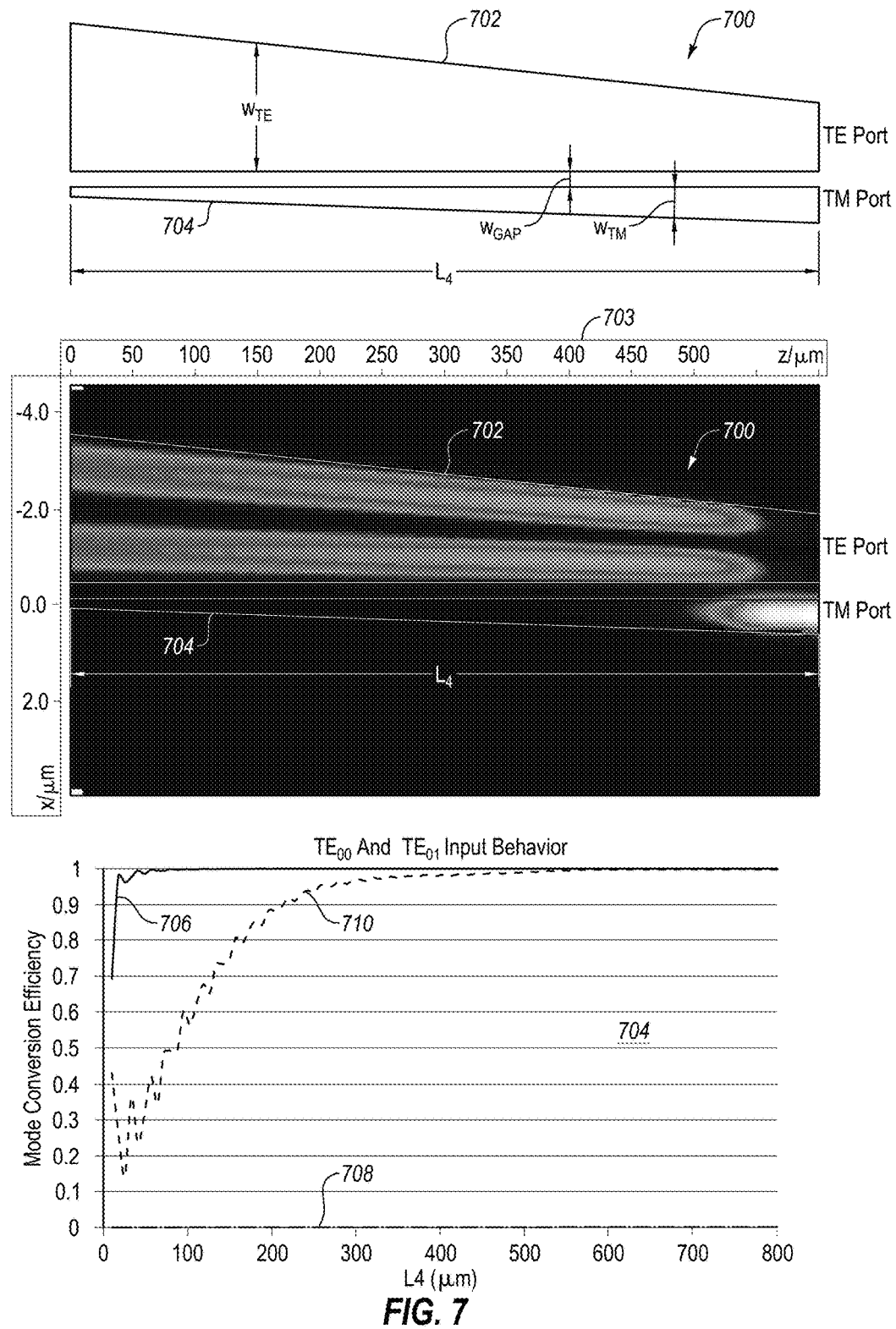
FIG. 7 illustrates an example second stage of the PRS of FIG. 2.

FIG. 7 illustrates an example second stage 700 of the PRS 202 of FIG. 2, arranged in accordance with at least one embodiment described herein. The second stage 700 may include or correspond to the second stage 108 of the PRS 100 of FIG. 1B. In particular, FIG. 7 illustrates an overhead view of two waveguide cores 702, 704 of the second stage 700, which waveguide cores may be surrounded by cladding (not illustrated in FIG. 7). The first waveguide core 702 may be a continuation of the waveguide core of the corresponding first stage 400 or 600 described previously. In comparison, the second waveguide core 704 may begin in the second stage 700.

The second stage 700 has a length $L_4$ and may function as a polarization splitter. Light in the TE00 polarization mode that propagates in the first waveguide core 702 may exit the first waveguide core 702, which includes an output that may be referred to as the TE port. The output of the first waveguide core 702 may be referred to as the TE port since light that entered the corresponding PRS (e.g., the PRS 202) with the TE00 polarization mode exits through the TE port. Light in the TE01 polarization mode that propagates in the first waveguide core 702 may be converted to the TE00 polarization mode and may be shifted to the second waveguide core 704 to exit the second waveguide core 704 through an output that may be referred to as the TM port. The output of the second waveguide core 704 may be referred to as the TM port since light that entered the corresponding PRS (e.g., the PRS 202) with the TM00 polarization mode exits through the TM port, albeit with the TE00 polarization mode.

The first and second waveguide cores 702, 704 are separated by a gap width $w_{gap}$. The gap width $w_{gap}$ may be constant along the length $L_4$ of the second stage 700.

The first waveguide core 702 has a width $w_F$ that varies along the length $L_4$. In particular, the first waveguide core 702 is illustrated as tapering inwardly in the propagation direction (e.g., from left to right) along the length $L_4$ and with a linear taper.

The second waveguide core 704 has a width $w_{TM}$ that varies along the length $L_4$. In particular, the second waveguide core 704 is illustrated as tapering outwardly in the propagation direction (e.g., from left to right) along the length $L_4$ and with a linear taper.

A simulation 703 in FIG. 7 simulates evolution of the TE01 polarization mode to the TE00 polarization mode in the second stage 700. In particular, light with TE01 polarization that enters the first waveguide core 702 (e.g., from the first stage 400 or 600) of the second stage 700 evolves into TE00 polarization and shifts to the second waveguide core 704. The changing geometry of the first waveguide core 702 (e.g., the inward taper) may cause the first waveguide core 702 to no longer support the TE01 polarization mode somewhere along the length $L_4$. The changing geometry of the second waveguide core 704 (e.g., the outward taper) may cause the second waveguide core 704 to support the TE00 polarization mode somewhere along the length $L_4$. In particular, at some point along the length $L_4$ effective indices of TE01 in the first waveguide core 702 and of TE00 in the second waveguide core 704 cross and consequently the TE01 light in the first waveguide 702 can adiabatically make transition to the TE00 polarization mode in the second waveguide core 704.

A simulation 704 in FIG. 7 simulates mode conversion efficiency as a function of the length $L_4$ of the second stage 700. The simulation 704 includes a first curve 706 that represents conversion efficiency of TE00 to TE00 in the TE port, a second curve 708 that represents conversion efficiency of TE01 to TM00 in the TE port, and a third curve 710 that represents conversion efficiency of TE01 to TE00 in the TM port. As illustrated in the simulation 704, the TE01 to TE00 conversion efficiency in the TM port is about 0.998 (<0.01 dB loss) at a length $L_4$ of about 500 μm.

Table 2 below includes measurements of the gap width $w_{gap}$, as well as of the width $w_{TE}$ of the first waveguide core 702 and of the width $w_{TM}$ of the second waveguide core 704 at left and right sides of the second stage 700 of FIG. 7 according to an example embodiment.

TABLE 2

| | Left | Right |
|---|---|---|
| $w_{TE}$ (μm) | 3 | 1.4 |
| $w_{TM}$ (μm) | 0.18 | 0.7 |
| $w_{gap}$ (μm) | 0.35 | 0.35 |

The foregoing parameters of the first and second waveguide cores 702 and 704 of the second stage 700 may have the same or other values in other embodiments.

Figure 8:
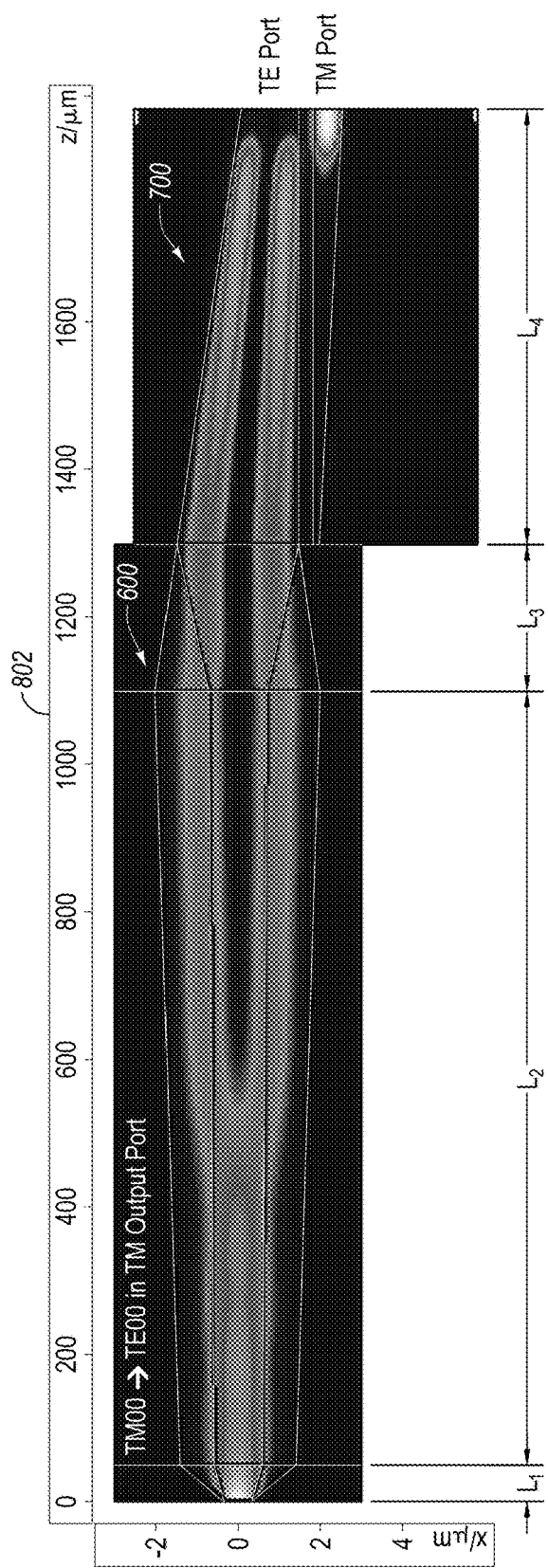
FIG. 8 illustrates a simulation of evolution of the TM00 polarization mode to the TE00 polarization mode in the combined first stage and the second stage of FIGS. 6 and 7.

FIG. 8 illustrates a simulation 802 of evolution of the TM00 polarization mode to the TE00 polarization mode in the combined first stage 600 and the second stage 700 of FIGS. 6 and 7, arranged in accordance with at least one embodiment described herein. The simulation 802 is a combination of the simulations 606 and 703 of FIGS. 6 and 7. Assuming L1=50 μm, L2=1050 μm, L3=200 μm, and L4=600 μm, the TM00 to TE00 conversion efficiency of the combined first and second stages 600, 700 at the TM port may be about 0.997, or about 0.013 dB loss. A polarization split ratio (TM port/TE port) may be about 29 dB. As will be described with respect to FIG. 9, one or more S-bends may be added to separate the TE and TM output ports. A waveguide core making up each S-bend may have a width of 0.7 μm in some embodiments, a port separation of the S-bends may be about 10 μm in some embodiments.

Figure 9:
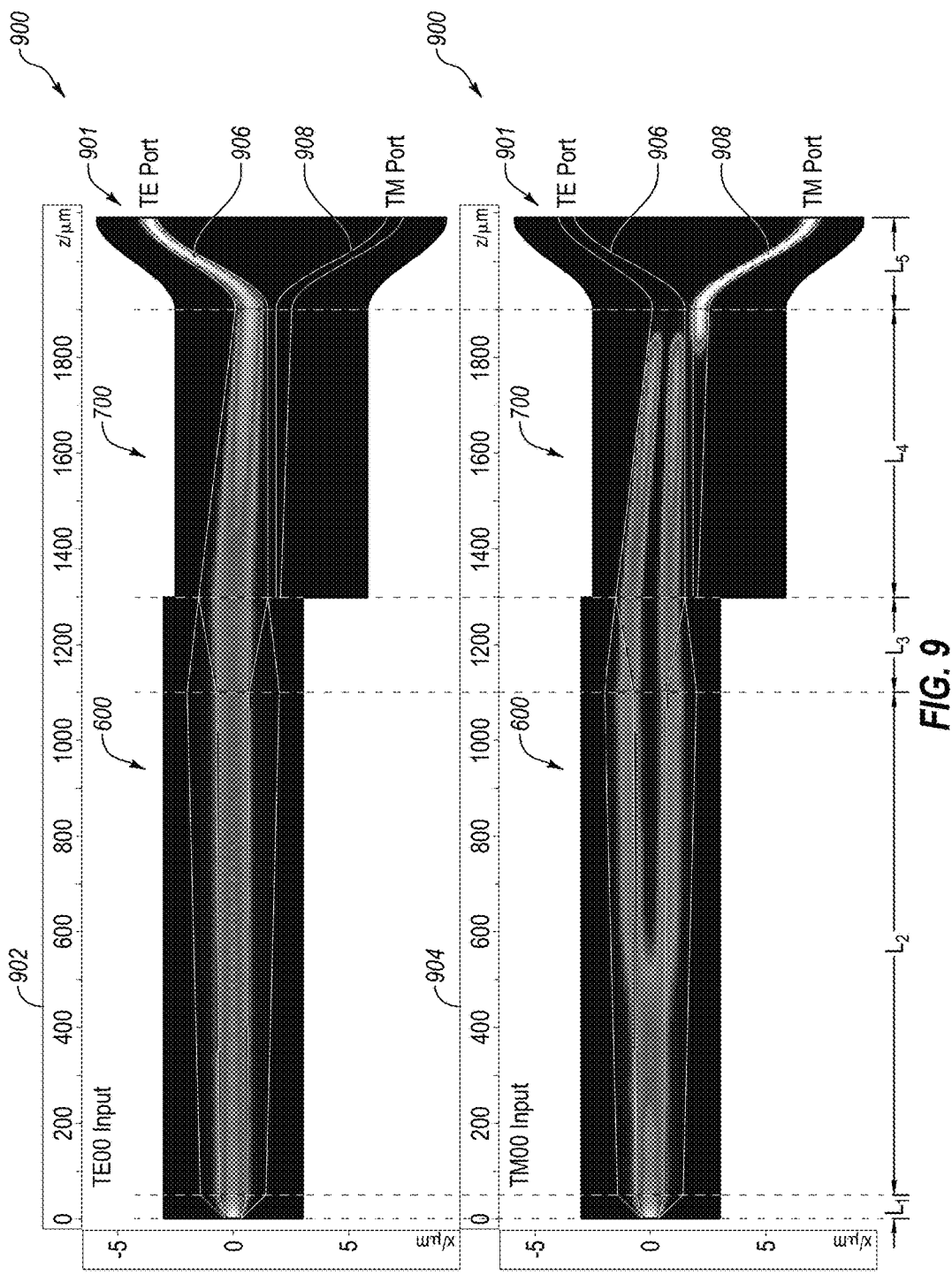
FIG. 9 illustrates simulations of evolution of the TM00 and TE00 polarization modes in a PRS.

FIG. 9 illustrates simulations 902, 904 of evolution of the TM00 and TE00 polarization modes in a PRS 900, arranged in accordance with at least one embodiment described herein. The PRS 900 is separately illustrated in each of the simulations 902 and 904. The PRS 900 may include or correspond to the PRS 100 of FIGS. 1A and 1B. The PRS 900 includes the first stage 600 of FIG. 6, the second stage 700 of FIG. 7, and a third stage 901.

The third stage 901 may include or correspond to the third stage 110 of the PRS 100 of FIG. 1B. The third stage 901 includes two S-bends 906, 908, each coupled to a corresponding one of the TE port or the TM port of the second stage 700. An output of the S-bend 906 may be referred to as a TE port of the PRS 900, while an output of the S-bend 908 may be referred to as a TM port of the PRS 900.

The first simulation 902 illustrates evolution of the TE00 polarization mode to the TE00 polarization mode in the PRS 900. As illustrated, light that enters the first stage 600 with the TE00 polarization mode maintains the TE00 polarization mode throughout the PRS 900 and exits the PRS 900 through the TE port.

The second simulation 904 illustrates evolution of the TM00 polarization mode to the TE00 polarization mode in the PRS 900. As illustrated, light that enters the first stage 600 with the TM00 polarization mode is converted to the TE01 polarization mode within the first stage 600, which is then converted from the TE01 polarization mode to the TE00 polarization mode within the second stage 700 as described with respect to FIG. 7, to exit the PRS 700 through the TM port, albeit with TE00 polarization.

Table 3 below includes measurements and a description of each section, having lengths $L_1$, $L_2$, $L_3$, $L_4$, and $L_5$, of the PRS 900 of FIG. 9 according to at least one embodiment described herein.

| Section | Length (µm) | Description |
| --- | --- | --- |
| $L_1$ | 50 | Strip-rib taper |
| $L_2$ | 1050 | TM00 to TE01 conversion |
| $L_3$ | 200 | Rib-strip taper |
| L4 | 600 | Two waveguide taper to transfer TE01 to TE00 in TM port |
| $L_5$ | 200 | S-bends to separate TE and TM ports |

The foregoing parameters may have the same or other values in other embodiments.

Table 4 below includes simulated performance for the TE00 and TM00 polarization modes in the PRS 900 of FIG. 9 according to at least one embodiment described herein.

| Input | Loss (dB) | Polarization Split Ratio (dB) |
| --- | --- | --- |
| TE00 | 0.01 | 37 dB |
| TM00 | 0.03 | 26 dB |

The foregoing parameters may have the same or other values in other embodiments.

Embodiments described herein may be combined with embodiments disclosed in the '842 publication. For instance, in some embodiments, a system may include a rib waveguide core such as described with respect to FIGS. 2, 4, and/or 6, a strip waveguide core, such as a SiN strip waveguide core, and an interposer waveguide. The strip waveguide core may have a first end continuously coupled to the rib waveguide core and a second end opposite the first end, where the second end includes a tapered end. The interposer waveguide may be disposed above or below the tapered end of the strip waveguide core and may be aligned laterally and longitudinally with the tapered end to form an adiabatic coupler with the strip waveguide core.

Alternatively or additionally, such embodiments may include a PRS with both a TE port and a TM port formed in a Si PIC. The Si PIC may further include a first wavelength division demultiplexer (demux) formed at least partially in a SiN layer of the Si PIC, the first demux including an input coupled to the TE port of the PRS. The Si PIC may further include a second demux formed at least partially in the SiN layer of the Si PIC, the second demux including an input coupled to the TM port of the PRS.

II. Second Example Embodiment

Figure 10:
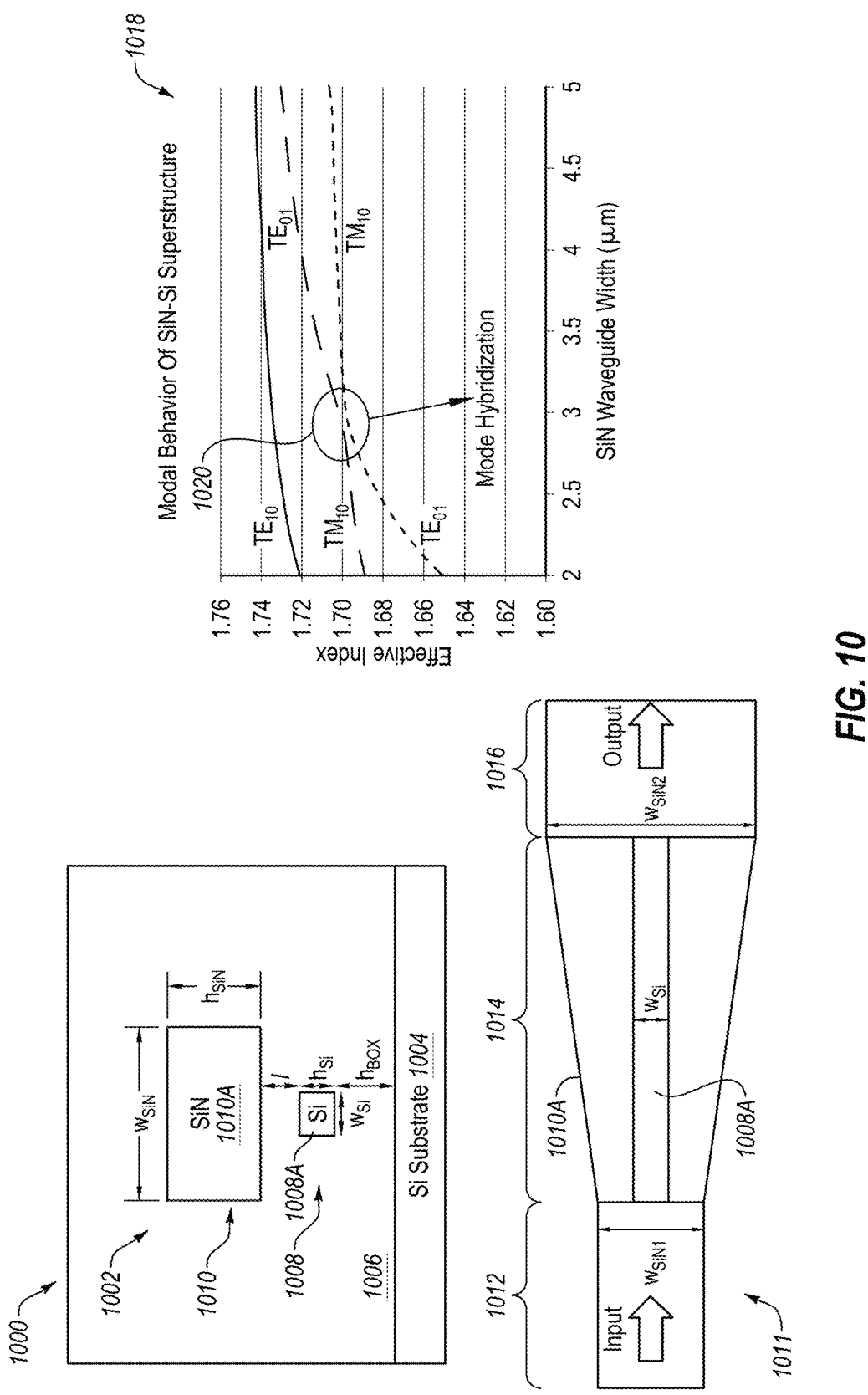
FIG. 10 includes a cross-sectional view of a portion of a Si PIC with a PRS.

FIG. 10 includes a cross-sectional view of a portion of a Si PIC 1000 with a PRS 1002, arranged in accordance with at least one embodiment described herein. The PRS 1002 may include or correspond to the PRS 100 of FIGS. 1A and 1B. The Si PIC 1000 may include a Si substrate 1004, a BOX layer 1006 that may include $SiO_2$ or other suitable oxide, a Si layer (not labeled) that includes a Si waveguide 1008, and a SiN layer (not labeled) that includes a SiN waveguide 1010. The Si PIC 1000 may include one or more other layers, components, materials, etc. as disclosed in the '842 publication.

The PRS 1002 includes the Si waveguide 1008 and the SiN waveguide 1010, each implemented as a strip waveguide. The Si waveguide 1008 includes a Si waveguide core 1008A together with surrounding cladding, which may include $SiO_2$ or other suitable cladding. The SiN waveguide 1010 includes a SiN waveguide core 1010A together with surrounding cladding, which may include $SiO_2$ or other suitable cladding.

In an example implementation, the BOX layer 1006 may have a thickness $h_{BOX}$ of about 2000 nm, the Si waveguide core 1008A may have a height $h_{Si}$ of about 300 nm and a width $w_{Si}$, the Si waveguide core 1008A may be vertically separated from the SiN waveguide core 1010A by a distance l of about 200 nm, and the SiN waveguide core 1010A may have a height $h_{SiN}$ of about 600 nm and a width $w_{SiN}$. In other embodiments, the various elements of the Si PIC 1000 may have values that may be the same or different than the foregoing.

FIG. 10 additionally includes an overhead view in the bottom left quadrant of FIG. 10 of the Si waveguide core 1008A and the SiN waveguide core 1010A, and which may form a first stage 1011 of the PRS 1002 together with the corresponding cladding for the Si and SiN waveguide cores 1008A and 1010A. The first stage 1011 of the overhead view of FIG. 10 may include or correspond to the first stage 106 of the PRS 100 of FIG. 1B.

As illustrated in the overhead view of FIG. 10, the width $w_{Si}$ of the Si waveguide core 1008A may be constant along its length in some embodiments. The width $w_{SiN}$ of the SiN waveguide core 1010A may be relatively narrow and constant at an input end 1012 of the SiN waveguide core 1010A and may be referred to as $w_{SiN1}$ for the input end 1012, may taper outward through an overlap portion 1014 of the SiN waveguide core 1010A, and may be relatively wide and constant at an output end 1016 of the SiN waveguide core 1010A and may be referred to as $w_{SiN2}$ for the output end 1016.

Table 5 below includes values of the width $w_{Si}$ of the Si waveguide core 1008A, of the width $w_{SiN1}$ of the input end 1012 of the SiN waveguide core 1010A, and of the width $w_{SiN2}$ of the output end 1016 of the SiN waveguide core 1010A according to at least one embodiment described herein.

TABLE 5

| | Value (µm) |
|---|---|
| $w_{Si}$ | 0.265 |
| $w_{SiN1}$ | 2.4 |
| $w_{SiN2}$ | 3.4 |

The foregoing parameters may have the same or other values in other embodiments.

As illustrated in the overhead view of FIG. 10, the Si waveguide core 1008A only exists beneath the overlap portion 1014 of the SiN waveguide core 1010A. Introduction of the Si waveguide core 1008A beneath only the overlap portion 1014 of the SiN waveguide core 1010A provides vertical asymmetry of a propagation path to convert at least one polarization mode of an incoming light signal. The Si waveguide 1008 and the SiN waveguide 1010 together form a superstructure referred to as a SiN—Si superstructure.

FIG. 10 additionally includes simulations 1018 of effective index of the SiN—Si superstructure as a function of width $w_{SiN}$ of the SiN waveguide core 1010A for various polarization modes (TE10, TM10, and TE01), arranged in accordance with at least one embodiment described herein. The simulations of FIG. 10 assume that the SiN—Si superstructure has the configuration and values as described herein with respect to FIG. 10.

As discussed previously, Mode hybridization may occur when vertically asymmetric structural geometry (e.g., of the SiN—Si superstructure) changes (e.g., $w_{SiN}$ widens) and such change leads to the effective indexes of two different polarization modes crossing each other. Light in one polarization mode can switch to another polarization mode after the mode hybridization if the structural change is gradual and therefore the transition process is adiabatic (i.e., mode 2 remains as mode 2, and mode 3 remains as mode 3). With the foregoing in mind, it can be seen from the simulations 1018 of FIG. 10 that mode hybridization may occur for TM10 and TE01 polarization modes at a width $w_{SiN}$ of about 3 µm. That is, at a width $w_{SiN}$ of about 3 µm, TM10 polarization mode hybridizes with TE01 polarization mode and becomes the TE01 polarization mode after the width $w_{SiN}$ gradually increases over 3 µm. Thus, any light traveling in the SiN waveguide core 210 with TM10 polarization mode may convert polarization mode to the TE01 polarization mode at a width $w_{SiN}$ of about 3 µm. The hybridization point in the simulations 1018 is denoted at 1020.

In operation, light with the TM00 polarization mode enters the SiN waveguide 1010 at the input end 1012 and splits into the TM10 polarization mode (e.g., with two vertically displaced Gaussian lobes) upon encountering the SiN—Si superstructure. In particular, one of two lobes of the TM10 polarization mode generally propagates initially in the Si waveguide 1008 while the other of the two lobes of the TM10 polarization mode generally propagates initially in the SiN waveguide 1010. At the hybridization point 1020, e.g., at a width $w_{SiN}$ of the SiN waveguide core 1010A of about 3 µm, the TM10 and TE01 polarization modes hybridize and the TM10 polarization mode adiabatically converts to TE01 polarization mode. Light that had the TM00 polarization at the input end 1012 thereby exits the output end 1016 with the TE01 polarization mode.

The first stage 1011 illustrated in the overhead view of FIG. 10 may couple to a corresponding second stage, such as the second stage 700 illustrated and discussed elsewhere herein. In these and other embodiments, the PRS 1002 of FIG. 10 may include the first stage 1011 illustrated in the overhead view of FIG. 10, the second stage 700 of FIG. 7, and the third stage 901 of FIG. 9, or other suitable second and/or third stages.

Figure 11:
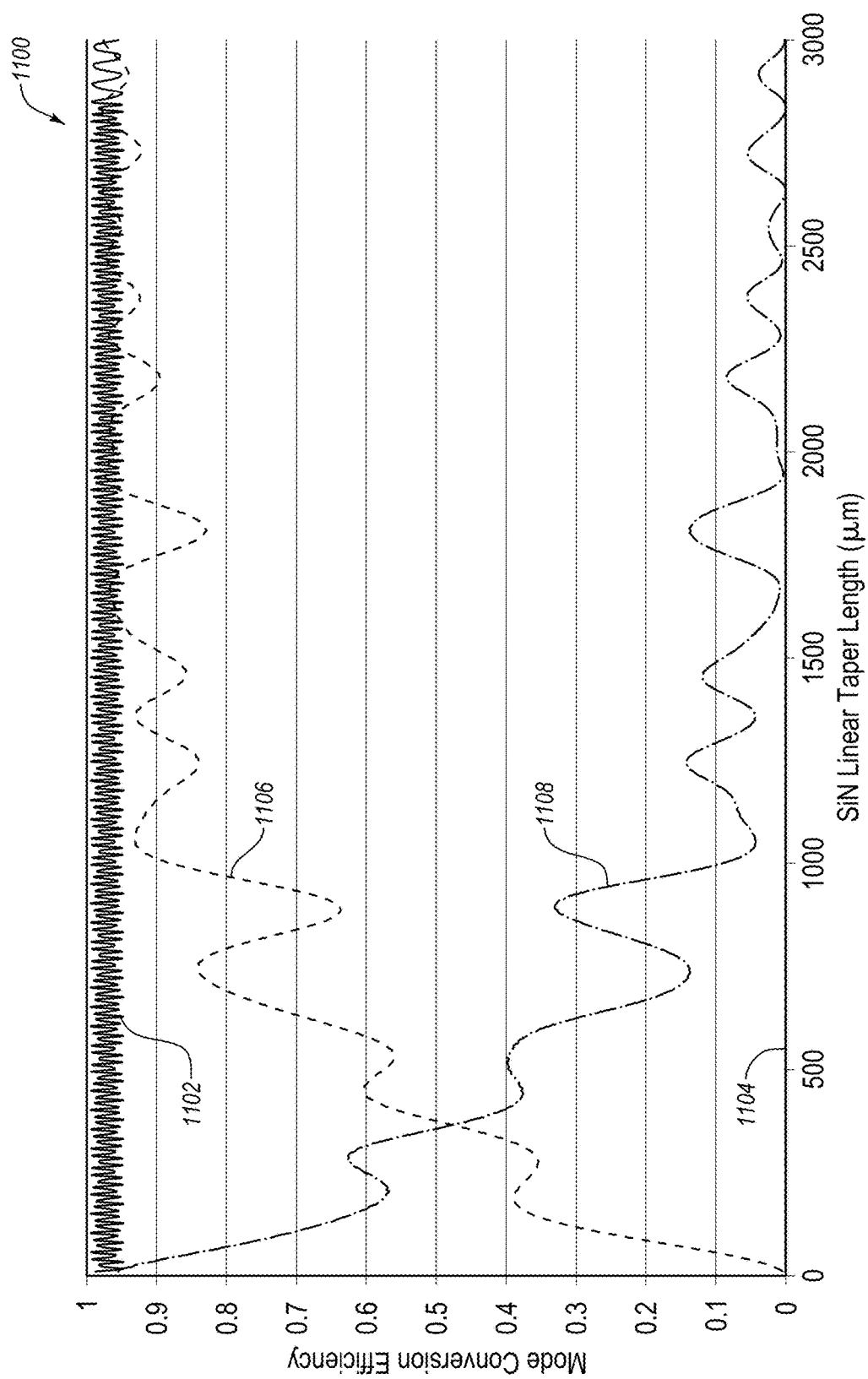
FIG. 11 simulates mode conversion efficiency as a function of SiN taper length of a first stage of the PRS of FIG. 10.

FIG. 11 simulates mode conversion efficiency as a function of SiN taper length of the first stage 1011 of FIG. 10, arranged in accordance with at least one embodiment described herein. SiN taper length refers to the length of the overlap portion 1014 of the SiN waveguide core 1010A of FIG. 10. The simulation of FIG. 11 includes a first curve 1102 that represents conversion efficiency of TE00 to TE00 for the first stage 1011 of the PRS 1002 of FIG. 10. The simulation of FIG. 11 additionally includes a second curve 1104 that represents conversion efficiency of TE00 to TE02 for the first stage 1011 of the PRS 1002 of FIG. 10. The simulation of FIG. 11 additionally includes a third curve 1106 that represents conversion efficiency of TM00 to TE01 for the first stage 1011 of the PRS 1002 of FIG. 10. The simulation of FIG. 11 additionally includes a fourth curve 1108 that represents conversion efficiency of TM00 to TM00 for the first stage 1011 of the PRS 1002 of FIG. 10. As illustrated in FIG. 11, with increasing SiN taper length, the conversion efficiency of TM00 to TE01 generally improves and the conversion of TM00 to TM00 generally decreases. Also, the conversion of TE00 to TE00 remains above about 95% efficiency as a function of SiN taper length (see first curve 1102) and the conversion of TE00 to TE02 remains at about 0% efficiency as a function of SiN taper length (see second curve 1104). At a SiN taper length of 2000 µm, the first stage 1011 of FIG. 10 has a TE00 to TE00 conversion efficiency of about 0.03 dB loss, and a TM00 to TE01 conversion efficiency of about 0.17 dB loss according to an example embodiment.

III. Third Example Embodiment

Figure 12:
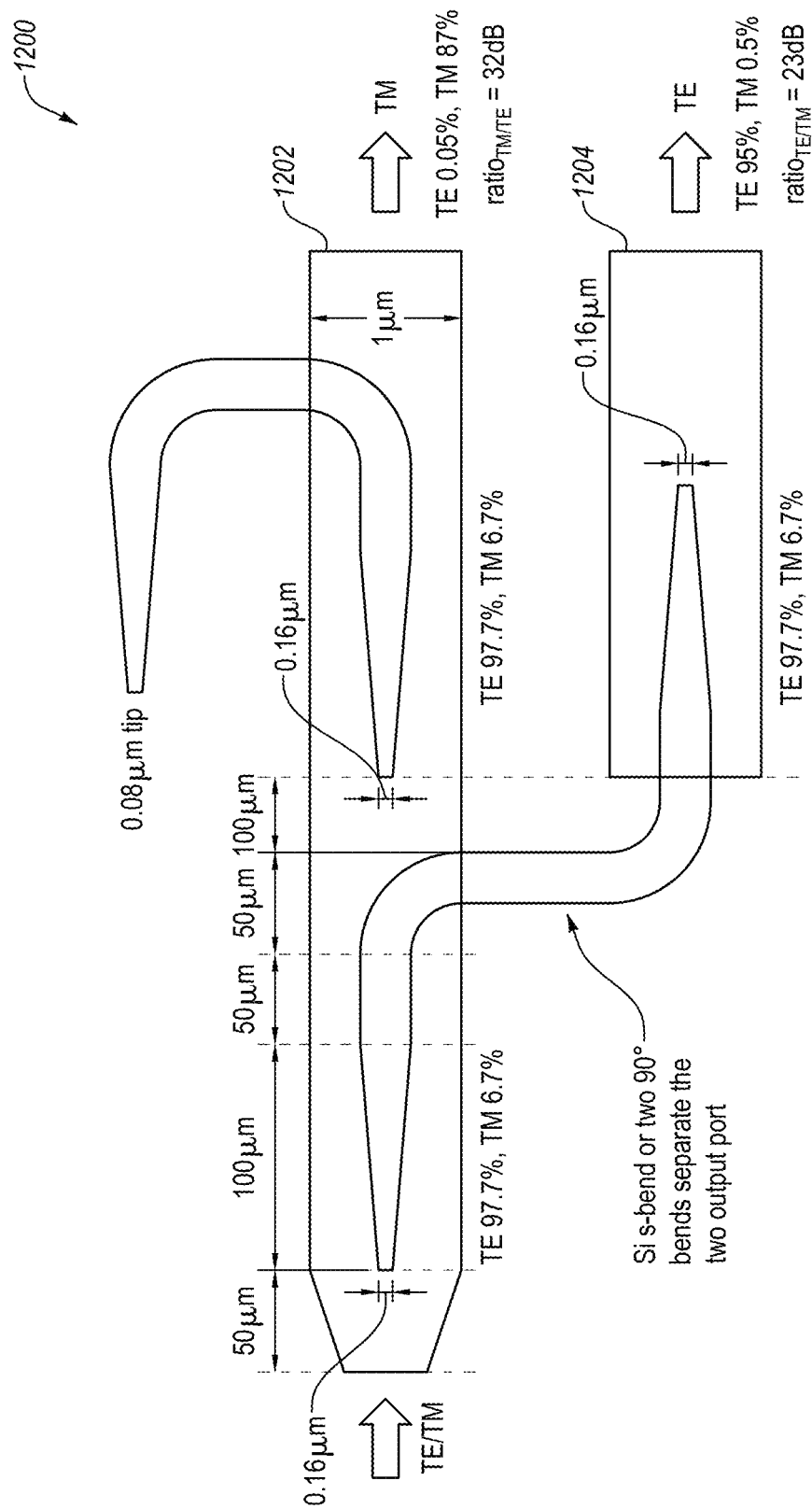
FIG. 12 illustrates an example polarization splitter as generally disclosed in the '842 publication.

FIG. 12 illustrates an example polarization splitter 1200 as generally disclosed in the '842 publication. Various distance measurements and performance values that may be associated with the polarization splitter 1200 according to an example embodiment are included in FIG. 12. As described in the '842 publication, the polarization splitter 1200 may be formed in a Si PIC. The polarization splitter 1200 outputs TM polarized light from a TM port 1202 and TE polarized light from a TE port 1204.

Some Si PICs and/or components thereof are configured and/or optimized for TE polarized light. Accordingly, embodiments described herein additionally include a polarization rotator that may be coupled to a TM port, e.g., the TM port 1202 of FIG. 12, to convert TM polarized light to TE polarized light. Alternatively or additionally, embodiments described herein may include a polarization rotator that may be coupled to a TE port, e.g., the TE port 1204 of FIG. 12, to convert TE polarized light to TM polarized light.

Figure 13:
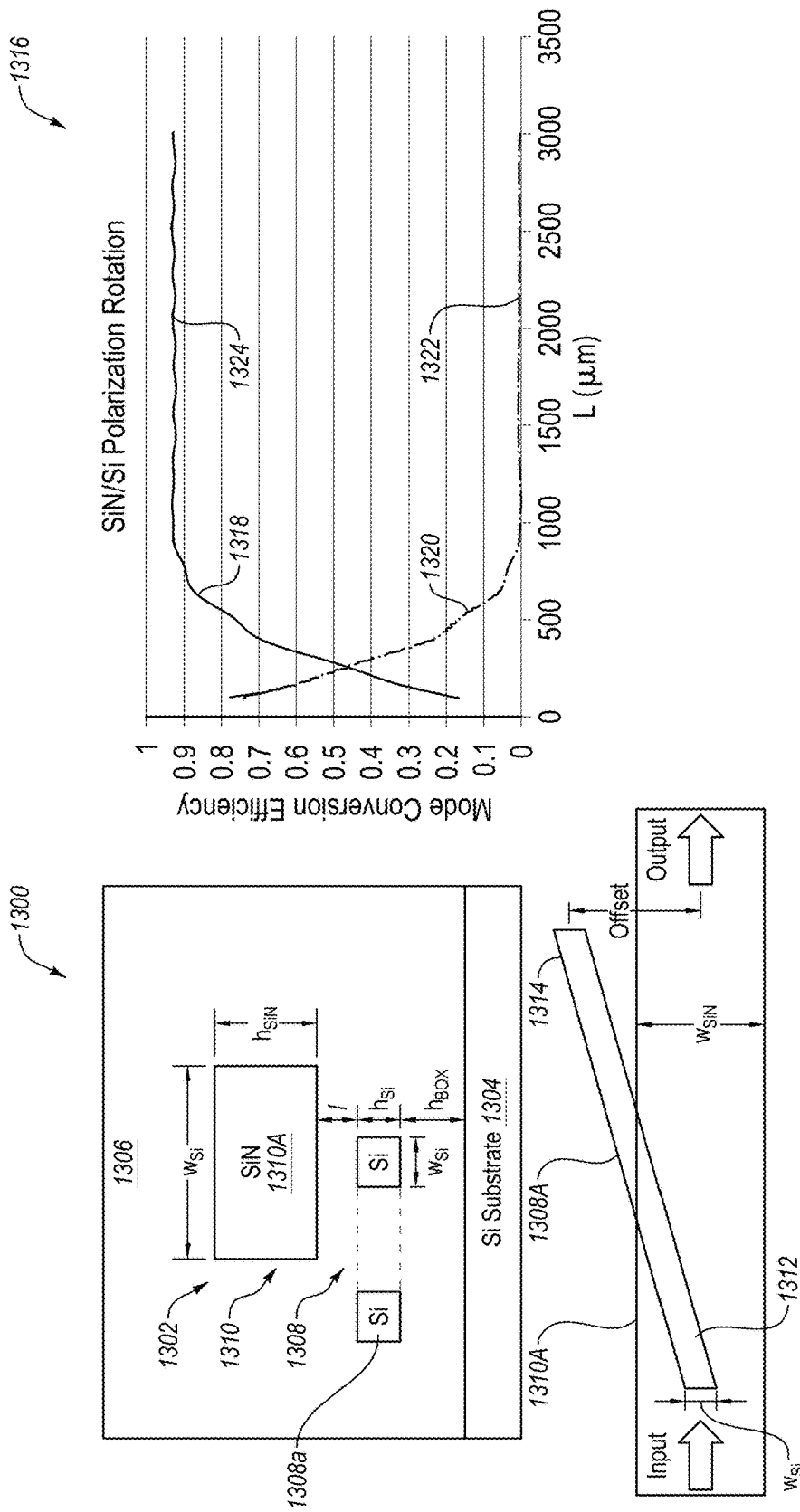
FIG. 13 includes a cross-sectional view of a portion of a Si PIC with a polarization rotator (PR)

Accordingly, FIG. 13 includes a cross-sectional view (generally upper left quadrant of FIG. 13) of a portion of a Si PIC 1300 with a polarization rotator (PR) 1302, arranged in accordance with at least one embodiment described herein. The Si PIC 1300 may include a Si substrate 1304, a BOX layer 1306 that may include $SiO_2$ or other suitable oxide, a Si layer (not labeled) that includes a Si waveguide 1308, and a SiN layer (not labeled) that includes a SiN waveguide 1310. The Si PIC 1300 may include one or more other layers, components, materials, etc. as disclosed in the '842 publication.

The PR 1302 includes the Si waveguide 1308 and the SiN waveguide 1310, each implemented as a strip waveguide. The Si waveguide 1308 includes a Si waveguide core 1308A together with surrounding cladding, which may include $SiO_2$ or other suitable cladding. The SiN waveguide 1310 includes a SiN waveguide core 1310A together with surrounding cladding, which may include $SiO_2$ or other suitable cladding.

In an example implementation, the BOX layer 1306 may have a thickness of about 2000 nm, the Si waveguide core 1308A may have a height $h_{Si}$ of about 300 nm and a width $w_{Si}$, the Si waveguide core 1308A may be vertically separated from the SiN waveguide core 1310A by a distance l of about 200 nm, and the SiN waveguide core 1310A may have a height $h_{SiN}$ of about 600 nm and a width $w_{SiN}$. In other embodiments, the various elements of the Si PIC 1300 may have values that may be different than those provided in FIG. 13.

FIG. 13 additionally includes an overhead view generally in the bottom left quadrant of FIG. 13 of the Si waveguide core 1308A and the SiN waveguide core 1310A. The Si waveguide core 1308A and the SiN waveguide core 1310A, together with surrounding cladding, may form the PR 1302 of FIG. 13. The SiN waveguide 1310 may be coupled to and/or continuous with a TM port of a polarization splitter, such as the TM port 1202 of the polarization splitter 1200 of FIG. 12.

As illustrated in the overhead view of FIG. 13, the width $w_{Si}$ of the Si waveguide core 1308A may be constant along its length in some embodiments. The width $w_{SiN}$ of the SiN waveguide core 1010A may also be constant along its length in some embodiments.

In contrast to the Si waveguide core 1008A of FIG. 10, the Si waveguide core 1308A of FIG. 13 is not aligned along its length with the SiN waveguide core 1310A. Instead a first end 1312 of the Si waveguide core 1308A is laterally aligned (e.g., centered) beneath the SiN waveguide core 1310A, but the Si waveguide core 1308A angles laterally away from the SiN waveguide core 1310A such that a second end 1314 of the Si waveguide core 1308A is laterally offset from a center of the SiN waveguide core 1310A by an offset distance.

Table 6 below includes values of the width $w_{Si}$ of the Si waveguide core 1308A, of the width $w_{SiN}$ of the SiN waveguide core 1310A, and of the offset between the second end 1314 of the Si waveguide core 1308A and the center of the SiN waveguide core 1310A according to at least one embodiment described herein.

TABLE 6

|  | Value (μm) |
|---|---|
| $w_{Si}$ | 0.23 |
| $w_{SiN}$ | 0.7 |
| offset | 0.8 |

The foregoing may have the same or other values in other embodiments.

FIG. 13 additionally includes a simulation 1316 of mode conversion efficiency as a function of length of the Si waveguide core 1308A of FIG. 13, arranged in accordance with at least one embodiment described herein. Length of the Si waveguide core 1308A refers to the actual length of the Si waveguide core 1308A, e.g., from the first end 1312 to the second end 1314. The simulation 1316 of FIG. 13 includes a first curve 1318 that represents conversion efficiency of TM00 to TE00 for the PR 1302 of FIG. 13. The simulation 1316 of FIG. 13 includes a second curve 1320 that represents conversion efficiency of TM00 to TM00 for the PR 1302 of FIG. 13. The simulation 1316 of FIG. 13 includes a third curve 1322 that represents conversion efficiency of TE00 to TE00 for the PR 1302 of FIG. 13. The simulation 1316 of FIG. 13 includes a fourth curve 1324 that represents conversion efficiency of TE00 to TM00 for the PR 1302 of FIG. 13. The first curve 1318 and the fourth curve 1324 overlap one another and are generally identical in the simulation 1316 of FIG. 13. The second curve 1320 and the third curve 1322 overlap one another and are generally identical in the simulation 1316 of FIG. 13. In an example embodiment and as illustrated by the simulation 1316, and at a Si length of about 900 μm or longer, the PR 1302 of FIG. 13 may have a TE00 to TM00 conversion efficiency of 0.31 dB loss with a corresponding ratio (TE00-unrotated/TM00) of about 23 dB, and a TM00 to TE00 conversion efficiency of 0.33 dB loss with a corresponding ratio (TM00-unrotated/TE00) of about 22 dB.

IV. Fourth Example Embodiment

Figure 14:
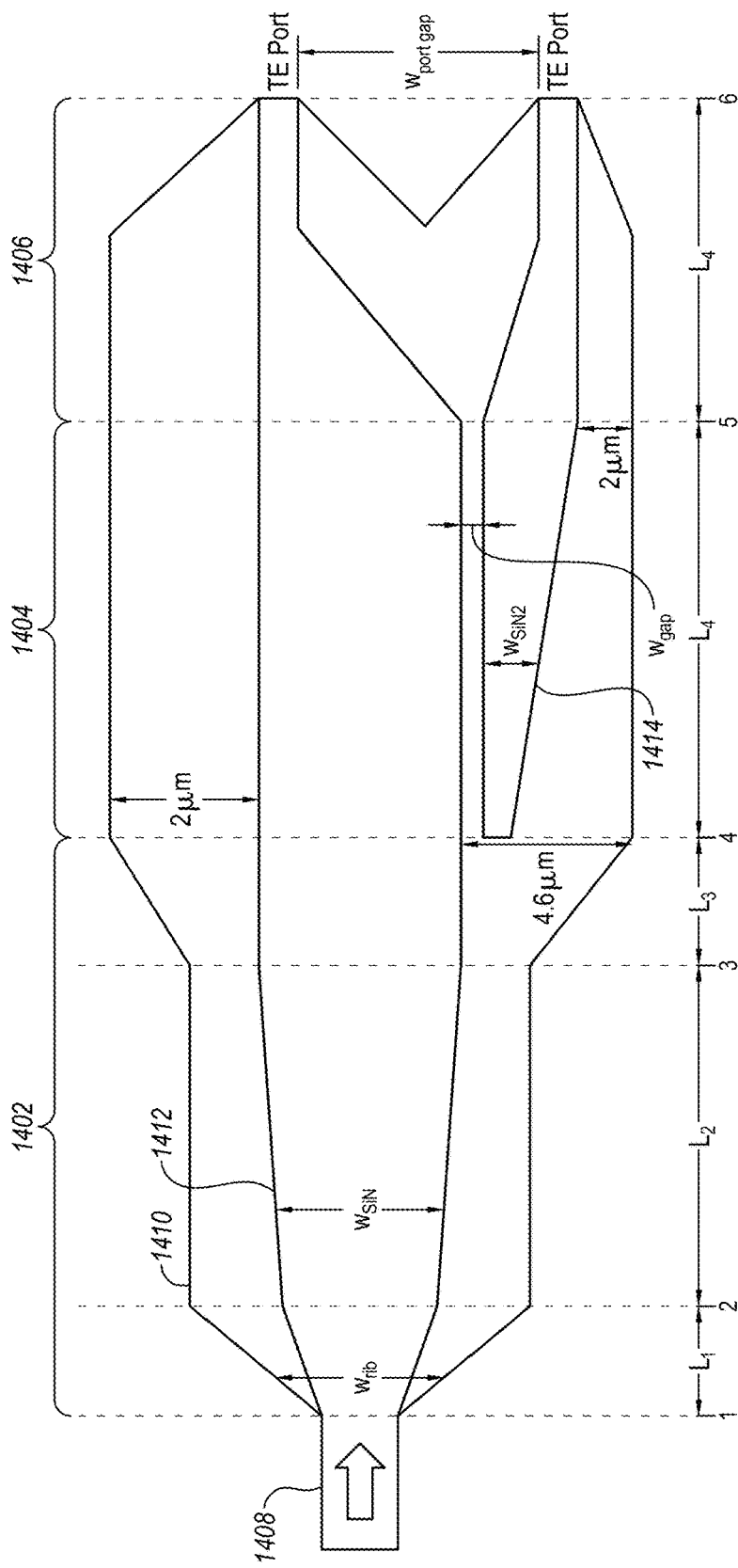
FIG. 14 illustrates another example PRS.

FIG. 14 illustrates another example PRS 1400, arranged in accordance with at least one embodiment described herein. In general, the PRS 1400 may include a first stage 1402, a second stage 1404, and a third stage 1406. The PRS 1400, the first stage 1402, the second stage 1404, and the third stage 1406 may respectively include or correspond to the PRS 100, the first stage 106, the second stage 108, and the third stage 110 of FIGS. 1A and 1B. The first stage 1402, the second stage 1404, and the third stage 1406 may respectively function in the same manner or at least an analogous manner as the first stage 400 or 600, the second stage 700, or the third stage 901 discussed elsewhere herein.

In more detail, FIG. 14 illustrates an overhead view of a waveguide core of the PRS 1400, which waveguide core may be surrounded by cladding (not illustrated in FIG. 14). The waveguide core may include SiN or other suitable material(s). The waveguide core may include or be coupled to an input 1408 that may have a square or rectangular cross section in some embodiments. For instance, the input may have a rectangular cross section with a height of 0.6 μm and a width of 0.7 μm. The input 1408 may include a strip waveguide core. Following the input 1408, a rib 1410 is formed in the waveguide core that tapers outward relatively quickly over a first length $L_1$ (e.g., from "1" to "2" in FIG. 14), that has a first constant width over a second length $L_2$ (e.g., from "2" to "3" in FIG. 14), that tapers outward relatively quickly over a third length $L_3$ (e.g., from "3" to "4" in FIG. 14), and that has a second constant width over a fourth length $L_4$ (e.g., from "4" to "5" in FIG. 14). Over a fifth length $L_5$ (e.g., from "5" to "6" in FIG. 14), the rib 1410 has the second constant width for a portion of the fifth length $L_5$ before tapering inward to two different output ports, labeled "TE port" and "TM port". Accordingly, the width of the rib 1410 may vary or remain constant along various lengths $L_1$-$L_5$ or portions thereof of the PRS 1400 and may be referred to as the rib width $w_{rib}$.

The rib 1410 may have a rib height $h_{rib}$, e.g., as illustrated in and described with respect to FIG. 2. The rib height $h_{rib}$ is less than a total height $h_{SiN}$ of the waveguide core, e.g., as illustrated in and described with respect to FIG. 2. The rib height $h_{rib}$ may be constant along the lengths $L_1$-$L_5$ and may be 0.35 μm. The total height $h_{SiN}$ may be constant along the lengths $L_1$-$L_5$ and may be 0.6 μm. In other embodiments, the rib height $h_{rib}$ and/or the total height $h_{SiN}$ may be variable along one or more of the lengths $L_1$-$L_5$ or portions thereof.

The waveguide core may have a first ridge 1412 with a top width $w_{SiN1}$, e.g., as illustrated in and described with respect to FIG. 2 as top width $w_{SiN}$, which may vary or remain constant along the various lengths $L_1$-$L_5$ or portions thereof. For example, as illustrated, the top width $w_{SiN1}$ tapers outward relatively quickly over the first length $L_1$, tapers outward relatively slowly over the second length $L_2$, and has a constant width over the third and fourth lengths $L_3$ to $L_4$. Over the fifth length $L_5$, the top width $w_{SiN1}$ tapers inward over a first portion of the fifth length $L_5$ before maintaining a constant width over a remaining portion of the fifth length $L_5$.

The waveguide core may additionally have a second ridge 1414 in the fourth and fifth lengths $L_4$ and $L_5$. The second ridge 1414 may be separated from the first ridge 1412 by a constant gap width $w_{gap}$ over the fourth length $L_4$, which gap width $w_{gap}$ may be 0.8 μm in some embodiments, or other suitable distance. The second ridge 1414 may have a top width $w_{SiN2}$, which may vary or remain constant along the fourth and fifth lengths $L_4$ and $L_5$ or portions thereof. For example, as illustrated, the top width $w_{SiN2}$ tapers outward over the fourth length $L_4$ and tapers inward over a first portion of the fifth length $L_5$ before maintaining a constant width over a remaining portion of the fifth length $L_5$. Over the fourth and fifth lengths $L_4$ and $L_5$, the first ridge 1412 and at least a portion of the rib 1410 and surrounding cladding forms a first rib waveguide while the second ridge 1414 and at least a portion of the rib 1410 and surrounding cladding forms a second rib waveguide.

Table 7 below includes measurements of each of the rib width $w_{rib}$, the top width $w_{SiN1}$ of the first ridge 1412, and the top width $w_{SiN2}$ of the second ridge 1414 in FIG. 14 according to an example embodiment and at one or more of locations "1", "2", "3", "4", "5", and "6" denoted with dashed lines in FIG. 14.

TABLE 1

|  | 1 | 2 | 3 | 4 | 5 | 6 |
|---|---|---|---|---|---|---|
| $w_{rib}$ (μm) | 0.7 | 4.2 | 4.2 | 9.6 | 9.6 | 0.7 |
| $w_{SiN1}$ (μm) | 0.7 | 2 | 3 | 3 | 3 | 0.7 |
| $w_{SiN2}$ (μm) | — | — | — | 0.2 | 1.8 | 0.7 |

The foregoing parameters may have the same or other values in other embodiments.

The first stage 1402 may generally function as a polarization rotator and may be configured to rotate TM00 polarization to TE01 polarization, similar to the first stages 400 and/or 600 discussed elsewhere.

The second stage 1404 may generally function as a polarization splitter, similar to the second stage 700 discussed elsewhere. In particular, light with the TE00 polarization that enters the first rib waveguide formed by the first ridge 1412, at least a portion of the rib 1410, and the surrounding cladding may pass through the second stage 1404 primarily or entirely through the first rib waveguide.

In comparison, light with TE01 polarization that enters the first rib waveguide (e.g., from the first stage 1402) of the second stage 1404 evolves into TE00 polarization and shifts to the second rib waveguide formed by the second ridge 1414, at least a portion of the rib 1410, and the surrounding cladding. The changing geometry of the second ridge 1414 (e.g., the outward taper) may cause the second rib waveguide to more favorably support the TE00 polarization mode somewhere along the fourth length $L_4$. In particular, at some point along the fourth length $L_4$ effective indices of TE01 in the first rib waveguide and of TE00 in the second rib waveguide cross and it becomes more favorable for the light to transition from the TE01 polarization in the first rib waveguide to the TE00 polarization mode in the second rib waveguide.

The third stage 1406 may generally function similar to the third stage 901 discussed elsewhere, e.g., to separate the TE and TM ports by a suitable distance. In the example of FIG. 14, the TE and TM ports may be separated by port gap distance $w_{port\_gap}$ 4.2 μm or other suitable distance at the output of the third stage 1406.

Portions of the PSR 1400 may be combined with other embodiments disclosed herein. For example, some, but not all, of the first stage 1402, the second stage 1404, and the third stage 1406 may be combined with one or more other stages described herein. As a particular example, the first stage 1402 may be replaced by the first stage 1011 of FIG. 10 in combination with the second stage 1404 and the third stage 1406 of FIG. 14. Other substitutions and/or combinations may be possible.

Performance of the PSR 1400 of FIG. 14 may be the same or similar to performance of the PSR 900 illustrated in and/or described with respect to FIG. 9. Alternatively or additionally, the PSR 1400 of FIG. 14 may have more fabrication tolerance than the PSR 900 of FIG. 9, taking into account SiN waveguide sidewall angles and SiN thickness variation. In at least one embodiment, the PSR 1400 of FIG. 14 may have a polarization extinction ratio (PER) greater than 20 dB for light with wavelengths in a range from 1.26 μm to 1.34 μm.

Figure 15:
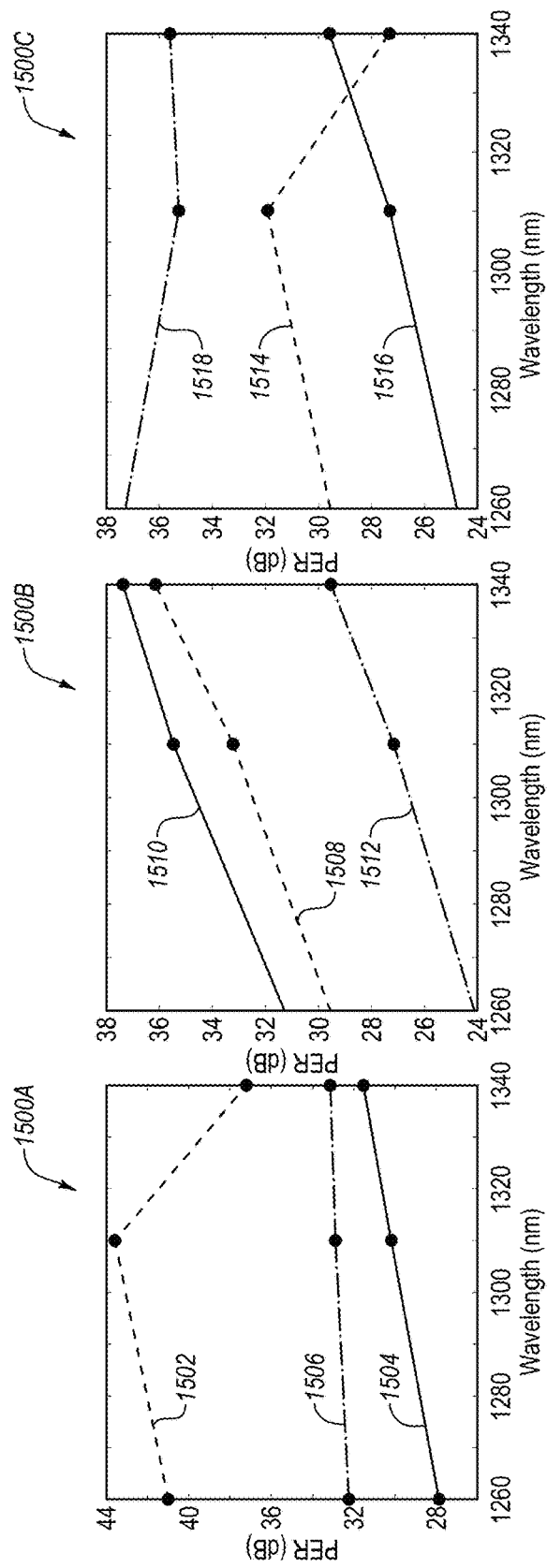
FIG. 15 includes simulations of polarization extinction ratio (PER) for a second length $L_2$ of the PSR of FIG. 14.

FIG. 15 includes simulations 1500A-1500C of PER for the second length $L_2$ of the PSR 1400 of FIG. 14, arranged in accordance with at least one embodiment described herein. PER in FIGS. 15A-15C refers to the TM00 to TE01 conversion, e.g., a ratio of TE01 polarization to TM00 polarization at the output of the second length $L_2$ of the PSR 1400. The simulation 1500A assumes the total height $h_{SiN}$ of the waveguide core in FIG. 14 is 0.60 μm. The simulation 1500B assumes the total height $h_{SiN}$ of the waveguide core is 0.59 μm. The simulation 1500C assumes the total height $h_{SiN}$ of the waveguide core is 0.61 μm. The simulation 1500A includes three curves 1502, 1504, and 1506 corresponding to rib height $h_{rib}$ for the rib 1410 of, respectively, 340 nm, 350 nm, and 360 nm. The simulation 1500B includes three curves 1508, 1510, and 1512 corresponding to rib height $h_{rib}$ for the rib 1410 of, respectively, 330 nm, 340 nm, and 350 nm. The simulation 1500C includes three curves 1514, 1516, and 1518 corresponding to rib height $h_{rib}$ for the rib 1410 of, respectively, 350 nm, 360 nm, and 370 nm. It can be seen at least from FIG. 15 that the PER for the second length $L_2$ of the PSR 1400 of FIG. 14 is higher than 20 dB over SiN thickness variation ($h_{rib}$ and $h_{SiN}$) for light with wavelengths in the range from 1.26 μm to 1.34 μm.

Figure 16:
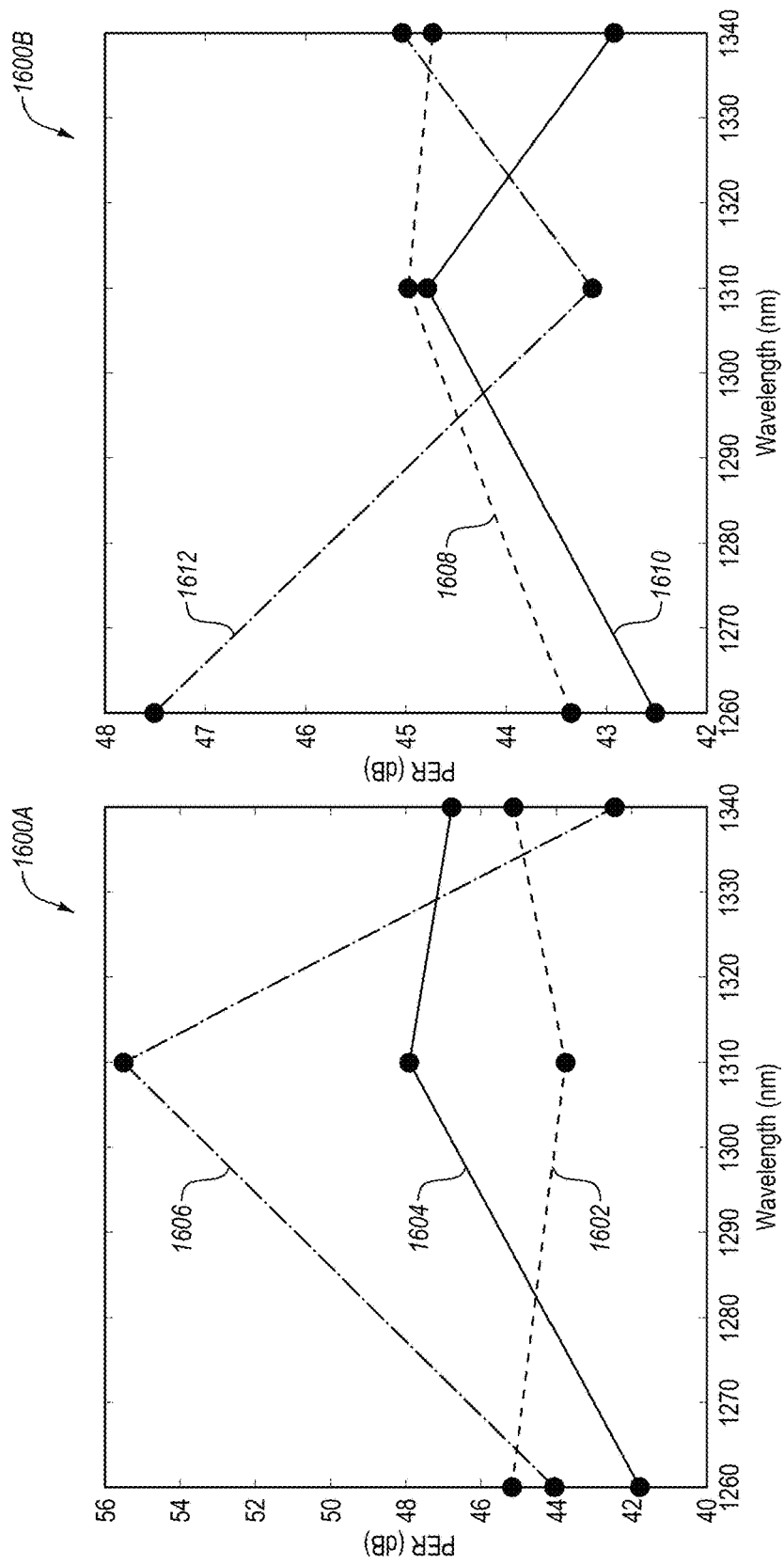
FIG. 16 includes simulations of PER for a fourth length $L_4$ of the PSR of FIG. 14, all arranged in accordance with at least one embodiment described herein.

FIG. 16 includes simulations 1600A-1600B of PER for the fourth length $L_2$ of the PSR 1400 of FIG. 14, arranged in accordance with at least one embodiment described herein. PER in FIGS. 16A-16B refers to the coupling of TE01 polarization to TE00 and TM00 in the second rib waveguide, e.g., a ratio of an amount of the TE01 polarization at the input of the first rib waveguide to an amount of TE00 and TM00 polarization at the output of the second rib waveguide over the fourth length $L_4$ of the PSR 1400. The simulation 1600A assumes the total height $h_{SiN}$ of the waveguide core in FIG. 14 is 0.59 μm. The simulation 1600B assumes the total height $h_{SiN}$ of the waveguide core is 0.60 μm. The simulation 1600A includes three curves 1602, 1604, and 1606 corresponding to rib height $h_{rib}$ for the rib 1410 of, respectively, 330 nm, 340 nm, and 350 nm. The simulation 1600B includes three curves 1608, 1610, and 1612 corresponding to rib height $h_{rib}$ for the rib 1410 of, respectively, 340 nm, 350 nm, and 360 nm. It can be seen at least from FIG. 16 that the PER for the fourth length $L_4$ of the PSR 1400 of FIG. 14 is higher than 40 dB over SiN thickness variation ($h_{rib}$ and $h_{SiN}$) for light with wavelengths in the range from 1.26 μm to 1.34 μm.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A system that includes a polarization rotator splitter (PRS), the PRS comprising:
    a silicon nitride (SiN) rib waveguide core that includes a rib and a ridge that extends vertically above the rib, the SiN rib waveguide core having a total height $h_{SiN}$ from a bottom of the rib to a top of the ridge, a rib height $h_{rib}$ from the bottom of the rib to a top of the rib, a rib width $w_{rib}$, and a top width $w_{SiN}$ of the ridge;
    wherein:
        the rib laterally extends beyond a first side of the ridge and beyond a second side of the ridge between opposing first and second sides of the rib;
        the rib width $w_{rib}$ is the width of the rib from the first side of the rib to the second side of the rib;
        the rib width $w_{rib}$ varies along at least a portion of a length of the SiN rib waveguide core;
        the ridge of the SiN rib waveguide core comprises a first ridge that together with the rib and surrounding cladding forms a first rib waveguide;
        the SiN rib waveguide core further comprises a second ridge that together with the rib and surrounding cladding forms a second rib waveguide;
        the second ridge is spaced apart from the first ridge by a gap width w in a portion of the PRS;
        the top width $w_{SiN}$ of the first ridge is constant through the portion of the PRS; and
        the second ridge has a top width $w_{SiN2}$ that tapers outward through the portion of the PRS.

2. The system of claim 1, wherein the first ridge and the second ridge are separated by a port gap distance $w_{port\ gap}$ at an output of the PRS, the port gap distance $w_{port\ gap}$ at the output of the PRS being greater than the gap width $w_{gap}$ between the first ridge and the second ridge in the portion of the PRS.

3. The system of claim 1, wherein:
    the SiN rib waveguide core has a first section of length $L_1$, a second section of length $L_2$, and a third section of length $L_3$;
    the rib is linearly tapered in each of the first and third sections;
    the first ridge is linearly tapered in each of the first and second sections; and
    at the beginning of the first section, the widths $w_{rib}$ and $w_{SiN}$ are equal to each other.

4. The system of claim 3, wherein:
    the portion of the PRS comprises a fourth section of length $L_4$; and
    along the length $L_4$ of the fourth section, the rib width $w_{rib}$ is constant.

5. The system of claim 1, wherein the gap width $w_{gap}$ is constant through the portion of the PRS.

6. The system of claim 1, the PRS further comprising:
    a first stage that includes the first rib waveguide;
    a second stage coupled end to end with the first stage, wherein the second stage comprises the portion of the PRS with the first and second ridges of the first and second rib waveguides spaced apart by the gap width $w_{gap}$; and
    a third stage coupled end to end with the second stage, wherein:
        the third stage comprises the first rib waveguide and the second rib waveguide;
        the first ridge tapers inward through a first portion of the third stage and has a constant width through a remaining portion of the third stage;
        the second ridge tapers inward through the first portion of the third stage and has the constant width through the remaining portion of the third stage;
        the rib has a constant width through the first portion of the third stage;
        in the remaining portion of the third stage, the rib divides into a first sub-rib associated with the first ridge and a second sub-rib associated with the second ridge;
        each of the first and second sub-ribs tapers inward through the remaining portion of the third stage.

7. The system of claim 1, further comprising:
    a SiN strip waveguide core having a first end continuously coupled to an input of the SiN rib waveguide core and a second end opposite the first end, the second end including a tapered end; and
    an interposer waveguide disposed above or below the tapered end of the SiN strip waveguide core and aligned laterally and longitudinally with the tapered end to form an adiabatic coupler with the SiN strip waveguide core.

8. The system of claim 7, wherein the PRS and the SiN strip waveguide core are formed in a SiN layer of a silicon (Si) photonic integrated circuit (PIC) and wherein the PRS includes a TE port and a TM port, the Si PIC further comprising:
    a first wavelength division demultiplexer (demux) formed at least partially in the SiN layer of the Si PIC, the first demux including an input coupled to the TE port of the PRS; and
    a second demux formed at least partially in the SiN layer of the Si PIC, the second demux including an input coupled to the TM port of the PRS.

9. A system that includes a polarization rotator splitter (PRS), the PRS comprising:
    a first stage that includes a silicon nitride (SiN) rib waveguide core that includes a rib and a ridge that extends vertically above the rib, the SiN rib waveguide core having a total height $h_{SiN}$ from a bottom of the rib to a top of the ridge, a rib height $h_{rib}$ from the bottom of the rib to a top of the rib, a rib width $w_{rib}$, and a top width $w_{SiN}$ of the ridge, wherein the rib width $w_{rib}$ varies along at least a portion of a length of the SiN rib waveguide core;
a second stage that includes:
  a first strip waveguide core continuous with the SiN rib waveguide core and that laterally tapers inward from a first end of the first strip waveguide core to a second end of the first strip waveguide core; and
  a second strip waveguide core spaced apart from the first strip waveguide core by a gap width $w_{gap}$, the second strip waveguide core tapering outward from a first end of the second strip waveguide core to a second end of the second strip waveguide core; and
a third stage that includes:
  a first S-bend waveguide core continuous with the first strip waveguide core; and
  a second S-bend waveguide core continuous with the second strip waveguide core,
  wherein output ends of the first and second S-bend waveguide cores are laterally separated by a greater distance than input ends of the first and second S-bend waveguide cores.

10. The system of claim 9, wherein:
the SiN rib waveguide core has a first section of length $L_1$, a second section of length $L_2$, and a third section of length $L_3$;
each of the rib and the ridge of the SiN rib waveguide core is linearly tapered in each of the first, second, and third sections; and
at the beginning of the first section, the widths $w_{rib}$ and $w_{SiN}$ are equal to each other.

11. The system of claim 10, wherein:
the second stage has a length $L_4$;
each of the first and second strip waveguide cores of the second stage is linearly tapered in the second stage through the length $L_4$; and
along the length $L_4$ of the second stage, the gap width $w_{gap}$ is constant.

12. The system of claim 9, further comprising:
a SiN strip waveguide core having a first end continuously coupled to the SiN rib waveguide core and a second end opposite the first end, the second end including a tapered end; and
an interposer waveguide disposed above or below the tapered end of the SiN strip waveguide core and aligned laterally and longitudinally with the tapered end to form an adiabatic coupler with the SiN strip waveguide core.

13. The system of claim 12, wherein the PRS and the SiN strip waveguide core are formed in a SiN layer of a silicon (Si) photonic integrated circuit (PIC) and wherein the PRS includes a TE port and a TM port, the Si PIC further comprising:
a first wavelength division demultiplexer (demux) formed at least partially in the SiN layer of the Si PIC, the first demux including an input coupled to the TE port of the PRS; and
a second demux formed at least partially in the SiN layer of the Si PIC, the second demux including an input coupled to the TM port of the PRS.

14. A system that includes a polarization rotator splitter (PRS), the PRS comprising:
a silicon nitride (SiN) rib waveguide core that includes a rib and a ridge that extends vertically above the rib, the SiN rib waveguide core having a total height $h_{SiN}$ from a bottom of the rib to a top of the ridge, a rib height $h_{rib}$ from the bottom of the rib to a top of the rib, a rib width $w_{rib}$, and a top width $w_{SiN}$ of the ridge;
wherein:
  the rib width $w_{rib}$ varies along at least a portion of a length of the SiN rib waveguide core;
  the ridge of the SiN rib waveguide core comprises a first ridge that together with the rib and surrounding cladding forms a first rib waveguide that is included in a first stage of the PRS;
  the SiN rib waveguide core further comprises a second ridge that together with the rib and surrounding cladding forms a second rib waveguide;
  the second ridge is spaced apart from the first ridge by a gap width $w_{gap}$; and
  the PRS further comprises a second stage that includes:
    a first portion of the first rib waveguide; and
    a first portion of the second rib waveguide;
  the top width $w_{SiN}$ comprises a first top width $w_{SiN1}$ of the first ridge;
  the first top width $w_{SiN1}$ of the first ridge is constant through the second stage;
  the second ridge has a top width $w_{SiN2}$ that tapers outward through the second stage; and
  the gap width $w_{gap}$ is constant through the second stage.

15. The system of claim 14, the PRS further comprising a third stage that includes:
a second portion of the first rib waveguide; and
a second portion of the second rib waveguide;
wherein:
  the first ridge tapers inward through a first portion of the third stage and has a constant width through a remaining portion of the third stage;
  the second ridge tapers inward through the first portion of the third stage and has the constant width through the remaining portion of the third stage;
  the rib has a constant width through the first portion of the third stage;
  in the remaining portion of the third stage, the rib divides into a first sub-rib associated with the first ridge and a second sub-rib associated with the second ridge;
  each of the first and second sub-ribs tapers inward through the remaining portion of the third stage.

16. The system of claim 14, further comprising:
a SiN strip waveguide core having a first end continuously coupled to the SiN rib waveguide core and a second end opposite the first end, the second end including a tapered end; and
an interposer waveguide disposed above or below the tapered end of the SiN strip waveguide core and aligned laterally and longitudinally with the tapered end to form an adiabatic coupler with the SiN strip waveguide core.

17. The system of claim 16, wherein the PRS and the SiN strip waveguide core are formed in a SiN layer of a silicon (Si) photonic integrated circuit (PIC) and wherein the PRS includes a TE port and a TM port, the Si PIC further comprising:
a first wavelength division demultiplexer (demux) formed at least partially in the SiN layer of the Si PIC, the first demux including an input coupled to the TE port of the PRS; and
a second demux formed at least partially in the SiN layer of the Si PIC, the second demux including an input coupled to the TM port of the PRS.

* * * * *